INVENTOR
S. T. BREWER
BY P. C. Smith
ATTORNEY

Feb. 2, 1954 S. T. BREWER 2,668,195

MARKING AND SWITCHING SYSTEM

Filed Dec. 29, 1949

9 Sheets-Sheet 2

INVENTOR
S.T. BREWER
BY
P. C. Smith
ATTORNEY

Feb. 2, 1954 S. T. BREWER 2,668,195

MARKING AND SWITCHING SYSTEM

Filed Dec. 29, 1949 9 Sheets-Sheet 3

INVENTOR
S. T. BREWER
BY P. C. Smith
ATTORNEY

Feb. 2, 1954 S. T. BREWER 2,668,195

MARKING AND SWITCHING SYSTEM

Filed Dec. 29, 1949 9 Sheets-Sheet 4

INVENTOR
S.T. BREWER
BY P. C. Smith
ATTORNEY

Feb. 2, 1954

S. T. BREWER 2,668,195

MARKING AND SWITCHING SYSTEM

Filed Dec. 29, 1949

9 Sheets-Sheet 5

INVENTOR
S.T. BREWER
BY P. C. Smith
ATTORNEY

INVENTOR
S.T. BREWER
BY P. C. Smith
ATTORNEY

Feb. 2, 1954 S. T. BREWER 2,668,195

MARKING AND SWITCHING SYSTEM

Filed Dec. 29, 1949 9 Sheets-Sheet 7

INVENTOR
S.T. BREWER
BY P. C. Smith
ATTORNEY

Feb. 2, 1954 S. T. BREWER 2,668,195

MARKING AND SWITCHING SYSTEM

Filed Dec. 29, 1949 9 Sheets-Sheet 8

INVENTOR
S.T. BREWER
BY P. C. Smith
ATTORNEY

Feb. 2, 1954

S. T. BREWER 2,668,195

MARKING AND SWITCHING SYSTEM

Filed Dec. 29, 1949

9 Sheets-Sheet 9

INVENTOR
S.T. BREWER
BY P. C. Smith
ATTORNEY

Patented Feb. 2, 1954

2,668,195

UNITED STATES PATENT OFFICE 2,668,195

MARKING AND SWITCHING SYSTEM

Sherman T. Brewer, Chatham Township, Morris County, N. J., assignor to Bell Telephone Laboratories, Incorporated, New York, N. Y., a corporation of New York Application December 29, 1949, Serial No. 135,769

11 Claims. (Cl. 179—22)

This invention relates to telephone switching systems and more particularly to apparatus for testing and selecting a channel through the switching equipment.

An object of this invention is to provide improved switching circuits, methods and apparatus for more rapidly and more economically establishing communication paths between subscribers' stations.

A feature of this invention is the provision of a single group of junction means which is selectively associable with the several groups of switches.

Another feature of this invention is the separating of channel selection and supervisory functions whereby the means for performing the channel selection function may be used in common by all of the switches.

A further feature of this invention is the provision of greatly simplified junction means.

Another feature of this invention is the provision of junction means provided with a mutual lock-out feature and provided with automatic releasing means.

Other objects and features of the invention will become apparent in the ensuing general and detailed descriptions of a preferred embodiment of the invention.

In the exemplary embodiment set forth herein, the cross-point relays are so-called reed relays comprising one or more sets of contacts sealed in individual glass containers or other suitable envelopes with a relay winding circumferential to the envelopes. When desired, a polarizing magnet may also be associated with each of the relays or in some cases with each of the contacts of the relays. Typical reed type relays are described in detail in United States Patent 2,245,391, granted to Dickten, Jr., June 10, 1941, in Patent 2,264,022, granted to Ellwood, November 25, 1941, and in Patent 2,289,830, granted to Ellwood, July 14, 1942. The disclosures of the foregoing patents are hereby made a part of the present application as is fully set forth herein.

Briefly, in accordance with the exemplary embodiment of this invention the circuits and equipment are arranged so that a subscriber in initiating a call first sets his calling device in accordance with the number or symbols designating the called subscriber's station. The subscriber may then check the accuracy of the setting of his equipment and if it is found to be properly conditioned the subscriber will then place his call by picking up the receiver or handset in the usual manner. As a result, the subscriber's calling equipment is connected and maintained connected to the line extending between the subscriber's station and the central station. The subscriber in initiating a call will then set into operation the equipment at the central station for applying a low frequency alternating current to the calling subscriber's line and for extending the transmission path from this line to certain call receiving and recording equipment. When these connections are established pulses are transmitted through the subscriber's calling device which will be received, recorded and checked by equipment at the central station. Thereafter a path is established from the register or receiving equipment through a number group circuit to determine the location of a called line or outgoing trunk circuit. The control equipment then transmits a signal to a circuit individual to the subscriber's line and also applies a marking voltage to a terminal associated with a trunk group. The circuit individual to the subscriber's line then applies a marking voltage and an identifying signal to the switching network.

In the exemplary embodiment set forth herein the switching network comprises a plurality of stages each stage of which comprises a group of relays arranged in a coordinate array. Each relay has associated with its winding a two-element gas-filled cold cathode tube. In the preferred embodiment of the invention each of the relays comprises a plurality of reed contacts each enclosed in a glass envelope and surrounded by an operating winding. Specifically, a group of such relays comprises in effect a switch. The switches are arranged on frames and in accordance with the exemplary embodiment herein one group of switches is called a line frame and another group of switches is called a trunk frame. A plurality of line frames and a plurality of trunk frames with their appropriate interconnections comprise the switching network. Each of these frames is provided with two groups of switches of the type described above. These groups of switches are usually called the primary group of switches and the secondary group of switches, and the primary and secondary switches are inter-connected in a manner similar to that employed in cross-bar switching systems. Interposed the two groups of frames are junction means or "mactors" each comprising a negative resistance element such as a cold cathode multielement gaseous conduction tube. These mactor tubes are arranged in a lock-out circuit and are self-extinguishing.

In the originating phase of a call, a marking condition is applied to only one of the subscriber's line terminals and to one or more terminals associated with idle trunks at the end of the switching equipment. This marking voltage which is applied to the line terminal causes the two-element gas tubes associated with various idle cross-points leading from the marking terminal to have a discharge initiated through them. Thus, discharges are initiated through all of the tubes associated with idle cross-points of the primary line switch associated with the marked line. The discharge current flowing through these tubes in turn relays the marking condition to other two-element gas discharge tubes associated with the idle cross-points of the secondary line switches through which possible paths extend from those primary cross-points having discharged tubes. Thus, the discharge through these tubes marks and relays a voltage condition through all of the idle paths from the marked line terminal to the group of mactor circuits associated with the line frame.

In addition to applying the marking voltage, the circuit individual to the subscriber's line transmits a signal indicative of the one of the several provided line frames with which the subscriber's station is associated. This signal operates selective means associated with the junction means or mactor circuits whereby but one line frame may utilize the provided mactors at any one time. Therefore, only one group of mactors need be provided for all provided line frames.

The marking condition applied to the trunk terminal is relayed through the trunk frames in a manner similar to the manner described above with reference to the line switch frame. If the trunk group comprises more than one trunk the trunks of this trunk group will be associated with different trunk frames. When it is desired to select a trunk of this group one idle trunk on each trunk frame of this group is marked. A marking voltage is relayed from all of the marked trunks through their respective primary and secondary switches. Certain of these marking voltages from the trunk frames are then applied to the junction means or mactors intermediate the line and trunk frames in accordance with which of the above-mentioned selective means has been operated by the signal transmitted from the subscriber's line circuit. Those trunk frame secondary switch outlets which are associated with secondary switches in the utilized line frame are connetced to the provided mactors so that the trunk frame marking voltages may be applied to the mactors, but those trunk frame secondary switch outlets associated with other line frames are not given access to the mactors. These marking voltages from the line frame and trunk frames are applied to different elements of tubes in the idle mactor circuits and are of sufficient magnitude to initiate a discharge through one or more of these tubes. However, as pointed out herein, these tubes have their elements connected to provide lock-out between the various tubes so that the discharge transfers to the main discharge path in one of the tubes only. This discharge then determines which of the idle paths from the marked line terminal to one of the marked trunk terminals will be utilized.

It should be noted that the negative resistance element or mactor tube operating in a lock-out circuit as described above not only selects an idle path through the switching system but also selects an idle trunk in a group of marked idle trunks. Thus both an idle path through the switching system and an idle trunk are selected with one operation, namely the initiation and transfer of the discharge across the main gap of one of the cold cathod gas discharge tubes of one mactor only.

While the above description assumes cold cathode two-element or multielement gas discharge tubes, it is to be understood that hot cathode gas discharge tubes as well as vacuum tubes may be employed if so desired.

The cold cathode gas discharge tubes referred to herein have two or more electrodes enclosed within a gas-tight envelope containing gas at a reduced pressure. The gas will usually comprise argon, neon or mixtures of these gases but may also comprise other inert gases as well as other gases and vapors such as mercury vapor, etc.

Upon the initiation of a discharge within a selected mactor tube and transfer across the main discharge path of that tube a circuit is completed for the operation of a relay, which relay in operating increases the current flow through the gas discharge tubes of the selected path and causes the relays at the associated cross-points to operate and to close their contacts thus establishing a metallic path through the switching system.

The tubes in the mactors are arranged to be self-extinguishing, and after a suitable interval the discharged tube is extinguished and the mactor relay released. This results in the final extinction of all of the gas discharge tubes in the selected path.

Supervision of the connection is continuous between the selected trunk and the subscriber's line circuit as is permitted by the use of a unidirectional current conducting device or varistor in the sleeve lead of the selected path. By this means, the necessity of relaying supervision through the junction means or mactor is avoided whereby the provided mactors may be used in common by all line frames as above mentioned.

Upon the establishment of a path to an idle trunk, the circuit connections within the office change so that alternating-current power for the operation of the calling device at the subscriber's station is supplied from the selected trunk circuit through the closed contacts of the switching system. This alternating-current power causes further pulses to be generated by the subscriber's equipment designating the called subscriber's station, which pulses are then transmitted from the subscriber's line, through the selected switching path through the switching system, and then over a trunk circuit either to the subject office or to a second central office depending upon the office designated. At the second central office, certain of the pulses are employed to establish a connection through that office in a manner similar to that described above and when sufficient information has been received at the final central office to establish a connection to the called subscriber's line a signal is sent back to the first office which is repeated through the subscriber's station which causes the equipment there to be switched from the calling or dialing condition to a telephone transmission condition. At the termination of the call the circuits are returned to normal by removing the calling potential to the various terminals of the switching equipment which allows the relays to release and to be restored to their normal or idle condition.

Novel features of the subject circuits disclosed but not claimed herein and full disclosures of elements schematically represented herein are presented and claimed in United States Patent 2,655,559 granted October 13, 1953, to W. A. Malthaner-H. E. Vaughan, and in the United States patent application of S. T. Brewer-E. Bruce, Serial No. 115,962, filed September 16, 1949, and in patents and applications cited therein, all of which are incorporated herein by reference.

The operation of the present embodiment of the invention may be more fully understood by the following brief description with reference to the simplified block schematic of Fig. 1 which shows in outline form various circuits and the manner in which they cooperate in a central office of the type embodied in the invention.

As shown in the drawing each office is provided with a switching network usually located on a plurality of supporting frames. Two line frames and two trunk frames are shown in the drawing and are arranged to handle calls within the office and between offices to and from subscribers' lines in each office by trunk circuits, of which four incoming and three outgoing trunks and a busy-tone trunk are shown in the drawing. Four subscribers' lines are shown connected to the depicted office. While only a few subscribers' stations, lines, trunks, frames and other circuits and apparatus are shown in the drawing, it is to be understood that any suitable number of the different circuits and apparatus may be provided. Only a limited number are shown in the drawing and described herein because the additional circuits will be substantially the same as those shown and will operate and cooperate with each other and the other circuits and equipment in a manner similar to the operation and cooperation of the circuits shown and described herein.

Each subscriber's station comprises apparatus for producing an audible ringing signal at the station in response to power transmitted from the central office, switchhook apparatus for indicating to the central office that the telephone set is on or off of its cradle, apparatus for generating dialing signals in response to power transmitted from the central office, talking apparatus and apparatus for switching under control of the central office from said signaling apparatus to said talking apparatus. A suitable form of subscribers' station equipment which will cooperate satisfactorily with the exemplary embodiment set forth herein is more fully disclosed in United States Patent 2,598,695 granted June 3, 1952, to H. E. Hill-D. B. Parkinson, and the disclosure thereof is hereby incorporated in this application by reference.

Common control apparatus is provided at each central office for establishing talking paths through the switching network on a one-at-a-time basis, either in response to dialing signals received from a subscriber's station associated with the same central office, or in response to dialing signals transmitted from a subscriber's station associated with another central office, through the other central office and over a trunk circuit from said other central office.

The number of switches per switching frame and the number of such switching frames provided can be expanded in an obvious manner together with suitably provided common control circuits of the type represented to furnish satisfactory service. The amount of equipment to be installed will vary with the number of subscribers, the calling habits of the subscribers, and the operating times of the apparatus. The particular types of apparatus intended for the physical embodiment of the invention have sufficiently fast operating characteristics that satisfactory service can be provided on a one-at-a-time basis to a group of subscribers of the size now commonly associated together in one central office.

The central office of Fig. 1 comprises subscribers' stations, such as station 110, equipped with preset repetitive dialing means; line conductors, such as conductors 111, extending between the subscriber's station and individual central office line circuits, such as line circuit 112; outgoing trunk circuits, such as trunk 113; and incoming trunk circuits, such as trunk circuit 114; together with a switching network comprising line frames, such as the No. 1 line frame 119; and trunk frames, such as the No. 1 trunk frame 120; by means of which desired connections may be established between any of said subscribers' stations and any of said outgoing trunks, or between any of said incoming trunks and any of said subscribers' stations.

Associated with the office are common control circuits, shown in Fig. 1 below the switching network, comprising an originating actuator 121 for transmission of power to a subscriber's station for causing thereat the generation of dialing signals designating a called destination; originating receiver and register circuits 122 for receiving such dialing signals from a calling subscriber's station and registering the information as to the desired destination; a connector circuit 123; and a trunk number group circuit 124 for identifying the location of the desired outgoing trunks on the switching network, performing an idle-busy-vacant test on such designated trunks and for establishing, in part, a connection through the switching network from the calling subscriber to one of said designated outgoing trunks. The common control equipment also includes an outward actuator 130 for supplying signal generating power to a calling subscriber's station from an outgoing trunk circuit and back through the switching network after a connection between the subscriber's station and a designated outgoing trunk has been established so that dialing or calling signals representing the desired called destination may again be generated at the subscriber's station and transmitted through the switching network and through the outgoing trunk for use in establishing subsequent connections toward the called destination.

For the establishment of a terminating connection between an incoming trunk and a called subscriber's station, the common control equipment also includes an incoming receiver and register 135 for receiving the dialing signals designating said called subscriber's station after transmission from a calling subscriber's subset through one or more switching systems, through an outgoing trunk circuit, and over an interconnecting trunk to an incoming trunk circuit of this terminating office; a connector circuit 136; and a subscribers' number group 137 for identifying the location of the said called subscriber's station on the switching network and for making an idle-busy-vacant test of said called station and for controlling the establishment, in part, at least, of a connection between said incoming trunk circuit and said called subscriber's station through the switching network.

Outgoing connections from an outgoing trunk of this office may terminate either in an incoming trunk of this same office for establishing a connection to a called subscriber in the same office, for example the connection 140, shown between outgoing trunk 113 and the incoming trunk 114 both in the office of Fig. 1, or such connection from an outgoing trunk may terminate in an incoming trunk in another office for the establishment of a connection to a designated called station in said other office, for example the connection 142 extending from the outgoing trunk 143.

A more detailed description with reference to these figures will now be made of the establishment of a connection between a subscriber in the office shown in Fig. 1 and a designated called subscriber in either the same or a different office. Assume, for example, that the subscriber provided with subset 110 desires to make such a call. He first presets the signal generating apparatus in his subset in accordance with the numbers or symbols representing the designation of the called subscriber's station to which he desires to establish connection. With the complete desired number preset, the subscriber then removes the telephone set from its cradle or switchhook thereby completing a direct-current circuit over conductors 111 for the operation of a line relay in line circuit 112, associated with his station. The operation of said line relay causes the operation of another relay in line circuit 112 for connecting an originating actuator 121 and receiver 122 to the line 111 and for removing said original direct-current line relay from the conductors 111 connecting said calling subset to the central office. The operation of said relay for connecting said calling line to the originating actuator 121 and receiver 122 is made in conjunction with a cold cathode gas tube associated with the line circuit, which gas tube is connected in lock-out with other similar gas tubes in other line circuits as is indicated by lock-out element 144. Therefore, in the event that two or more subscribers simultaneously remove their telephone sets from the cradles or switchhooks, only one of such subscribers will be immediately connected to said originating actuator, and all other said calling stations will be temporarily held with only their direct-current line relays operated awaiting access to an originating actuator and receiver until the first selected subscriber has been served. The types of gas tube lock-out circuits employed in the present embodiment of the invention and the operation of these lock-outs are set forth more fully in United States Patent 2,350,888, granted to N. I. Hall on June 6, 1944, and the disclosure of said patent is hereby incorporated in this specification by reference.

Upon the connection of the subscriber's subset 110 via line circuit 112 to the originating actuator 121, 45-cycle alternating-current power is transmitted from said actuator to said calling subscriber's subset to cause signal generating apparatus in that subset to generate calling or dialing signals representing the called subscriber's station designation as preset on the calling subscriber's subset. A complete called designation might consist, for example, of three symbols or numbers designating the called subscriber's central office, four digits designating the called subscriber's line number in said office and an additional symbol designating the party letter of the called subscriber associated with said called line. Under the control of the actuator these eight symbols or numbers designating the complete called number are rapidly generated repetitively.

During the intervals in which an actuator is supplying alternating-current power to a called subscriber's subset, the connection between the calling line circuit and the central office switching and control equipment is held under control of a monitoring detector in the alternating-current power path so that, if the calling subscriber returns his telephone set to its cradle or switchhook during such interval, the interruption of this flow of power current through the subset will result in the release of the connections thus far established for the call and the return to normal of all of the associated circuits.

Associated with originating actuator 121 is the originating receiver and register circuit 122. Said originating receiver examines the dialing signals generated in the calling subscriber's subset and transmitted to the receiver through the line circuit and through the originating actuator. The originating receiver and register 122 then proceeds to decode and register the numbers or symbols represented by the subsequent dialing signals. Suitable receiver and register circuits employed at this point in the present embodiment of the invention may be of the type disclosed in United States Patent 2,615,971 granted October 28, 1952, to Malthaner-Newby-Vaughan, and in United Patent 2,658,188 granted November 3, 1953, to Malthaner-Newby-Vaughan, and the disclosures of said applications are hereby made a part of the present disclosure as if set forth fully herein.

In the present embodiment of the invention, said originating receiver is arranged to decode and register only those symbols or numbers which designate the called central office, and as in the example mentioned above, such central office is commonly designated by three symbols or digits which ordinarily will be arranged to occur at the beginning of each complete number transmitted from a subset. When receiver and register 122 has registered the symbols or numbers designating the called central office, it connects itself through a connector circuit 123, connected in lock-out with other similar connectors as indicated by lock-out element 145, to the trunk number group 124 for locating an idle trunk to said designated office. Lock-out is required between connector 123 and other similar connectors because of the one-at-atime operation of the switching network. The method of testing for idle paths through the switching network in the selection of such an idle path for use in a connection, as set forth hereinafter for the present embodiment of the invention, requires that such testing and selection of paths through the switching network be performed on a one-at-time basis. Further, the testing and selection of paths through the switching network may be performed either by receiver 122 with number group 124 or by receiver 135 with number group 137, or in a large office a plurality of receivers similar to 122 may be provided, each with access to number group 124 and a plurality of receivers similar to 135 may be provided each with access to number group 137, with each receiver serving either a group of line circuits or a group of incoming trunk circuits. Thus, the lock-out arrangement between number group connectors is required to insure that only one connection between any number group circuit and a receiver exists at any one time to insure tests and selections on the switching network on a one-at-a-time basis.

Further, a large office might be arranged with a plurality of originating actuators and receivers with each such actuator-receiver combination having access to an individual group of lines.

By means of cold cathode gas tubes included in the trunk number group, an idle-busy-vacant test is made of the trunks in the designated trunk group and if there is one or more trunks idle in said designated trunk group, a relay in said receiver applies a voltage to a lead associated with said trunk group. One of the idle trunk circuits, of this trunk group, associated with each of the trunk frames is operated to extend this voltage to the sleeve lead appearances associated with idle trunks in said group at the trunk side of the switching network of the central office. If any of the outgoing trunks in the designated trunk group is in use in the path of a previously established connection, the voltage is not connected to such outgoing trunk leads but is connected only to the switching network appearances of the idle trunks in the group. Assume, for example, that the called office designated by the numbers preset on calling subscriber's subset 110, and registered in receiver 122 designates a subscriber in a distant office. By way of example, one circuit is shown in Fig. 1 for the establishment of an interoffice outgoing connection. This is shown by the circuit comprising outgoing trunk 143 which is connected via interoffice conductors 142 to an incoming trunk circuit in the distant office. Thus, in this case, with outgoing trunk 143 idle a voltage is connected from the trunk number group 124 through this trunk to the appearance of its sleeve lead at the left vertical of primary switch 150 on the No. 1 trunk frame 120 of the switching network of the shown office. At the same time, a signal is transmitted from the originating conductor 123 to the calling line circuit 112 for a purpose hereinafter to be noted.

The switching network comprises line frames and trunk frames. Both types of frames have primary and secondary switches or switching arrays of contacts. Each primary line and trunk switch or switching array has a number of vertical input columns across the switch to which are connected line or trunk circuits respectively and a number of horizontal output rows across the switch. Each of these rows and columns consists of three conductors, two for the usual talking path and the third is the sleeve lead. At the intersection of each row and column, hereinafter called a cross-point, is a relay consisting of an operating coil and three sets of make contacts. Two of these contact sets when closed connect the talking conductors associated with the particular input column to the talking conductors associated with the particular output row. A cold cathode gas diode is also associated with each cross-point relay, and this diode in series with the winding of the relay is connected between the sleeve lead of the vertical input column and the sleeve lead of the horizontal output row. The third contact set of the cross-point relay, when operated, short-circuits its associated gas diode. The use of these cross-point gas diodes in the sleeve leads facilitates the identification and selection of idle paths through the switching network, as described hereinafter, and the short-circuiting of said diodes at operated cross-points facilitates the holding of an established connection through the network and the maintenance of a busy indication along said established connection during the path selection processes of subsequent calls.

Each secondary switch or switching array is connected to form a similar rectangular array of cross-points except that the horizontal rows are used as input terminals and the vertical columns as switch outlets. However, in the secondary switches of the line frame, a fourth or control lead is also extended from each vertical, and the gas diode at the cross-point is connected between this control lead and the sleeve lead of the associated horizontal input row.

In addition, each line frame and each trunk frame comprises a number of such primary and secondary switches arranged so as to provide one talking path from each primary switch to each secondary switch. Specifically, for example, in Fig. 1 the line frame 119, with which the calling subscriber's station 110 is associated, may comprise any suitable number of primary switches, two of which 151 and 152 are shown in Fig. 1 by way of example, each switch having a plurality of input columns, two of which are represented in Fig. 1. Each input column is connected to a line circuit individual to a subscriber's station. Each line primary switch has a plurality, usually ten, of horizontal output rows, two of which, i. e., the first and last, are represented in Fig. 1. Line frame 119 also comprises a plurality of secondary switches, two of which, switches 153 and 154, are represented in the drawing. Each secondary switch is provided with horizontal inlets and a plurality of vertical outlets. The interconnecting conductors between primary and secondary switches, hereinafter called links, are connected as disclosed specifically, for example, in line frame 119 in which the upper primary switch 151 has its outlets connected to the upper inlet of the secondary switches, the top outlet of primary switch 151 connecting via path 155 to the top inlet of secondary switch 153 and the lower outlet of primary switch 151 connecting via path 156 to the top inlet of secondary switch 154, and in which the lower primary switch 152 has its outlets similarly connected to the lower inlets of the secondary switches, the top outlet of primary switch 152 connecting to the lower inlet of secondary switch 153 and the lower outlet of primary switch 152 connecting to the lower inlet of secondary switch 153. Intermediate switches will usually have their intermediate and first and last levels connected in a similar manner. Two such line frames are shown in the office of Fig. 1 for disclosing the operation of those features of the system which relate to cooperation and differentiation between the frames.

The line frames can be readily expanded in an obvious manner so as to provide switches and frames of any desirable size, and any desirable number of such frames may be provided having any desired number of input line circuits consistent with the operating times of the system and the calling habits of the subscribers and having a similarly consistent number of primary-secondary link paths and secondary outlets. For example, line frames might be provided with seventy inlets and ten outlets per primary switch and ten primary switches per line frame and with ten secondary switches per line frame, each having ten inlets and ten outlets. Thus such a frame would have 700 incoming lines and 100 secondary output paths.

Proceeding from the trunk output side of the switching network backwards through the office, a similar frame arrangement is disclosed. Trunk frame 120, for example, consists of a plurality of primary switches, such as switches 150 and 158, each having vertical multiples to each of which a trunk circuit is attached, such as trunks 114 and 143 connected to primary switch 150, and horizontal multiples each of which is connected to the horizontal input multiple of a secondary switch to provide one path or link from each primary switch to each secondary switch, as shown by the indicated paths 159 and 160 between primary switch 150 and secondary switches 161 and 162.

The trunk frames can be readily expanded in an obvious manner so as to provide switches and frames of any desirable size, and any desirable number of such frames may be provided having a number of trunk connections consistent with the operating times of the system and the amount of traffic to be handled and having a similarly consistent number of primary-secondary link paths and secondary outlets. For example, trunk frames might be provided comprising ten primary and ten secondary switches, each switch having ten inlets and ten outlets. In such case the frame would provide connection between 100 trunk terminals and 100 secondary switch terminals.

Connections are made between the secondary line frame switches and the secondary trunk frame switches to provide talking paths between each line frame and each trunk frame. These connections comprise a direct metallic connection for the talking conductors of each path but the third or sleeve leads between the line frame secondary switches and the trunk frame secondary switches are each provided with a unidirectional current conducting device or varistor, such as varistor 163.

Intermediate the line frames and the trunk frames are a plurality of junction means, hereinafter termed "mactors" which select which of the idle paths through the switches is to be employed. One of these mactors is provided for each of the links between the secondary switches in any one line frame and the associated trunk frame secondary switches. Thus, the control lead of the left vertical of line secondary switch 153 is associated with mactor M1, the control lead of the right vertical of switch 153 is associated with mactor M2, the control lead of the left vertical of secondary switch 154 in the No. 1 line frame 119 is associated with mactor M3, and the control lead of the right vertical of secondary switch 154 is associated with mactor M4. Similarly, the control leads from the secondary switches of other provided line frames are associated with these same mactors, only one group of mactors being provided for all line frames. Selective means are provided for enabling the mactors to be employed only by the line frame with which the utilized subscriber's line circuit is associated as will be seen hereinafter.

In the particular exemplary call being described, it has been determined that outgoing trunk 143 is available for service and that it is desired to connect the calling subscriber's line 111 to this trunk. In response to the aforesaid signal from connector 123, the line circuit 112 applies a "line mark" voltage to the switch sleeve lead associated with this calling line at the right vertical inlet of primary switch 151 on the No. 1 line frame 119. This voltage fires gas diodes between this primary switch vertical line input and the sleeve lead to each idle horizontal outlet of said primary switch. Assuming, in this case, that line frame 119 is completely idle, gas diodes between the aforementioned primary switch sleeve lead inlet and the sleeve lead outlet to each secondary switch fire, thereby altering the voltage condition on the sleeve leads associated with primary-secondary link paths 155 and 156. This altered link sleeve lead voltage, in turn, fires the gas diodes in the secondary switches between said link sleeve leads and the control lead of each idle secondary line switch output path. Thus, in the case of a completely idle frame, gas tubes are fired in the primary and secondary switch sleeve lead along the idle path from the input terminal associated with line circuit 112, line link path 155, to mactor M1, along similar individual idle paths from the said line circuit to mactors M2, M3 and M4 and also along other idle paths to other mactors not shown.

The line circuit 112 also responds to the signal from connector 123 to transmit a line frame signal. Since line circuit 112 is associated with the No. 1 line frame 119, this transmitted frame signal is indicative of that fact. This signal is transmitted via conductor 165 and operates the No. 1 frame relay 166. It may be noted that had a line circuit associated with line frame No. 2 been employed, the signal would have been transmitted over conductor 167 to operate the No. 2 frame relay 168.

With relay 166 operated, the sleeve leads of those interframe links associated with the No. 1 line frame 119 are connected to the mactors. Thus, for example, the sleeve lead from the right vertical of trunk secondary switch 161 is associated with mactor M1 through a contact of operated relay 166, the sleeve lead of the right vertical of trunk secondary switch 162 is connected to mactor M3 thru a contact of relay 166, and so forth.

Therefore, with a frame relay such as relay 166 operated, the voltage applied to the sleeve lead of the left primary vertical of trunk primary switch 150 associated with the desired outgoing trunk 143 fires gas diodes of the trunk frame primary and secondary switches and, in the case of a completely idle trunk frame, thereby establishes a connection through such fired diodes between said primary vertical leads, trunk link path 159 to mactor M1, and other similar connections are marked from the same said trunk vertical sleeve lead along similar individual paths to mactor M3 and also along other similar individual paths to other mactors not shown. If any of the link or mactor sections of any of the above-described paths through the switching network is in use as part of a previously established connection, the voltage, established by virtue of the holding condition on the sleeve lead of such busy section, as hereinafter described, is such that the gas diodes will not fire between said busy sections and the adjacent sections to which voltage marks have been extended.

Assuming only outgoing trunk 143 to be available, of the various idle line frame and trunk frame paths now marked by ionized gas diodes and shown on the drawing, only the paths with which mactors M1 and M3 are associated form possible complete paths between the calling line circuit 112 and the desired trunk 143. The other mactor circuits which have been marked from the line side, for example, mactor M2, terminate at trunk frames other than trunk frame 120 on which the desired trunk appears. Each of the mactor circuits M1 and M3, by means of the combination of altered voltages on the two control leads connected to each said mactor recognizes that it is associated with a possible complete path through the switching network and starts to function to complete this path. A cold cathode gas tube in each of these mactors is connected in a lock-out circuit as indicated by lock-out element 170, so that only one of said mactors will succeed in fully operating. Assume for example, that in this case mactor M1 is taken into service and that mactor M3 is locked out. At this time a relay in mactor M1 operates to reduce the impedance in the circuit through the gas diodes and cross-point relay coils associated with the sleeve lead path from the calling line to this mactor thereby causing sufficient current to flow in said path to operate said cross-point relays. A similar reduction of impedance occurs in the sleeve lead path from mactor M1 through the primary and secondary cross-point relays and diodes of trunk frame 120 to outgoing trunk 143 for operating the cross-point relays associated with this path. The operation of these four cross-point relays completes a talking connection between said calling subscriber's station 110 and outgoing trunk 143.

After a suitable interval the mactor tube is self-extinguished and as a result voltage changes occur which cause a circuit to be completed from the winding of a supervisory relay in the selected trunk circuit 143, via the sleeve lead of the selected path through the trunk frame, varistor 163, via the sleeve lead of the selected path through the line frame 119, and through the winding of a supervisory relay in line circuit 112. In this manner, supervision is obtained externally of the mactor circuit.

The common control equipment at the bottom of Fig. 1 which was utilized in the originating phase of the call is now released, and the trunk circuit proceeds with matters incident to the terminating phase of the call. This phase of the call is described in detail in the above-cited patent granted to Malthaner-Vaughan and the above-cited application of Brewer-Bruce, and applications and patents cited therein, and the method of operation of the novel features of the subject invention is substantially identical on both phases of a call, whether the call be interoffice of intraoffice.

*Detailed description*

A more complete understanding of the invention may be obtained from the following detailed description of a preferred embodiment thereof, when read with reference to the accompanying drawings in which:

Fig. 2 discloses a plurality of subscribers' stations and a line circuit individual to each of those stations;

Fig. 3 contains a representation of certain control equipment;

Figure 8:
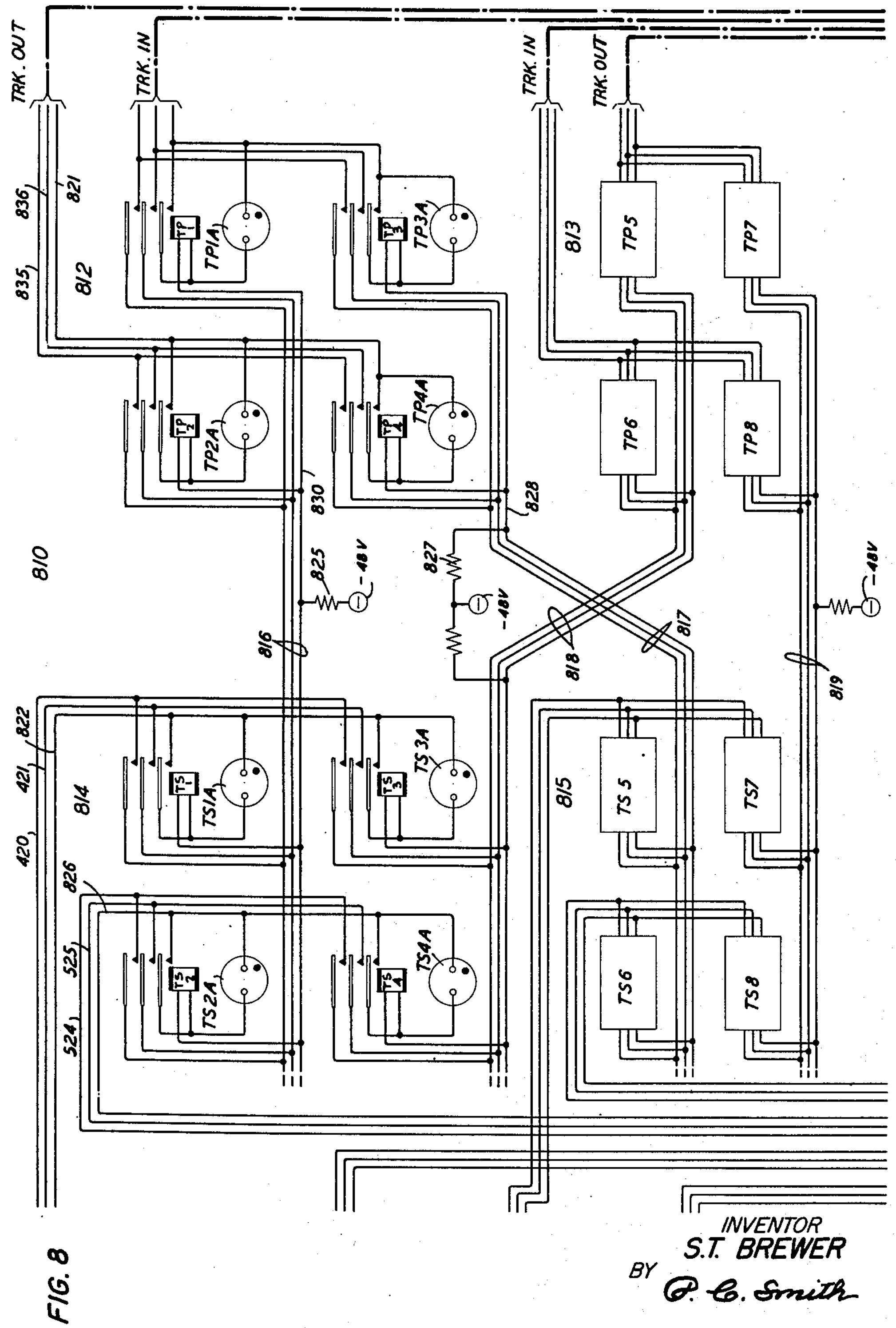
Figures 9, 10:
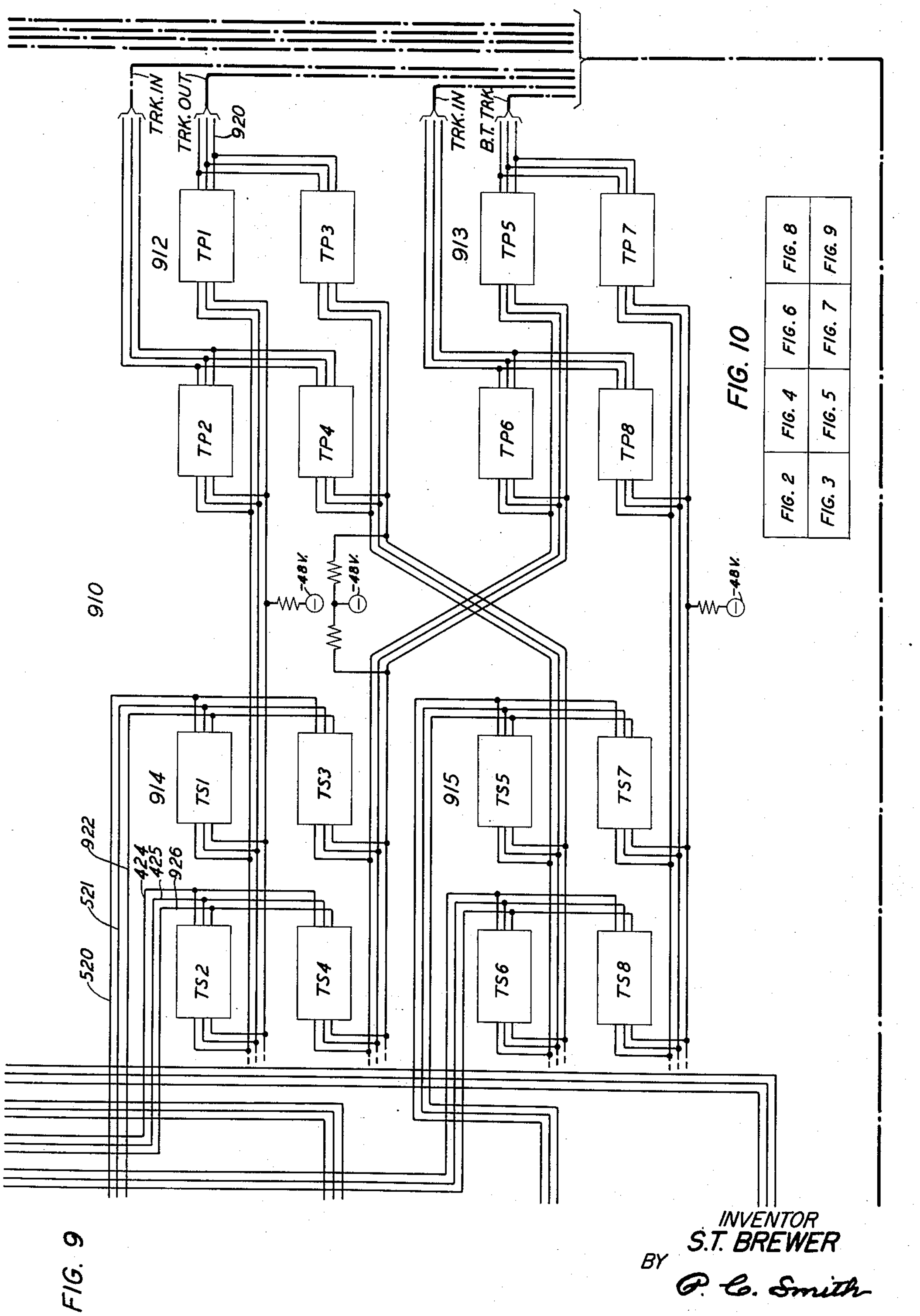

Figs. 8 and 9 disclose the primary and secondary switches of a first and a second trunk frame, respectively; and Fig. 10 shows the method of arranging Figs. 2 to 9, inclusive.

Figure 3:
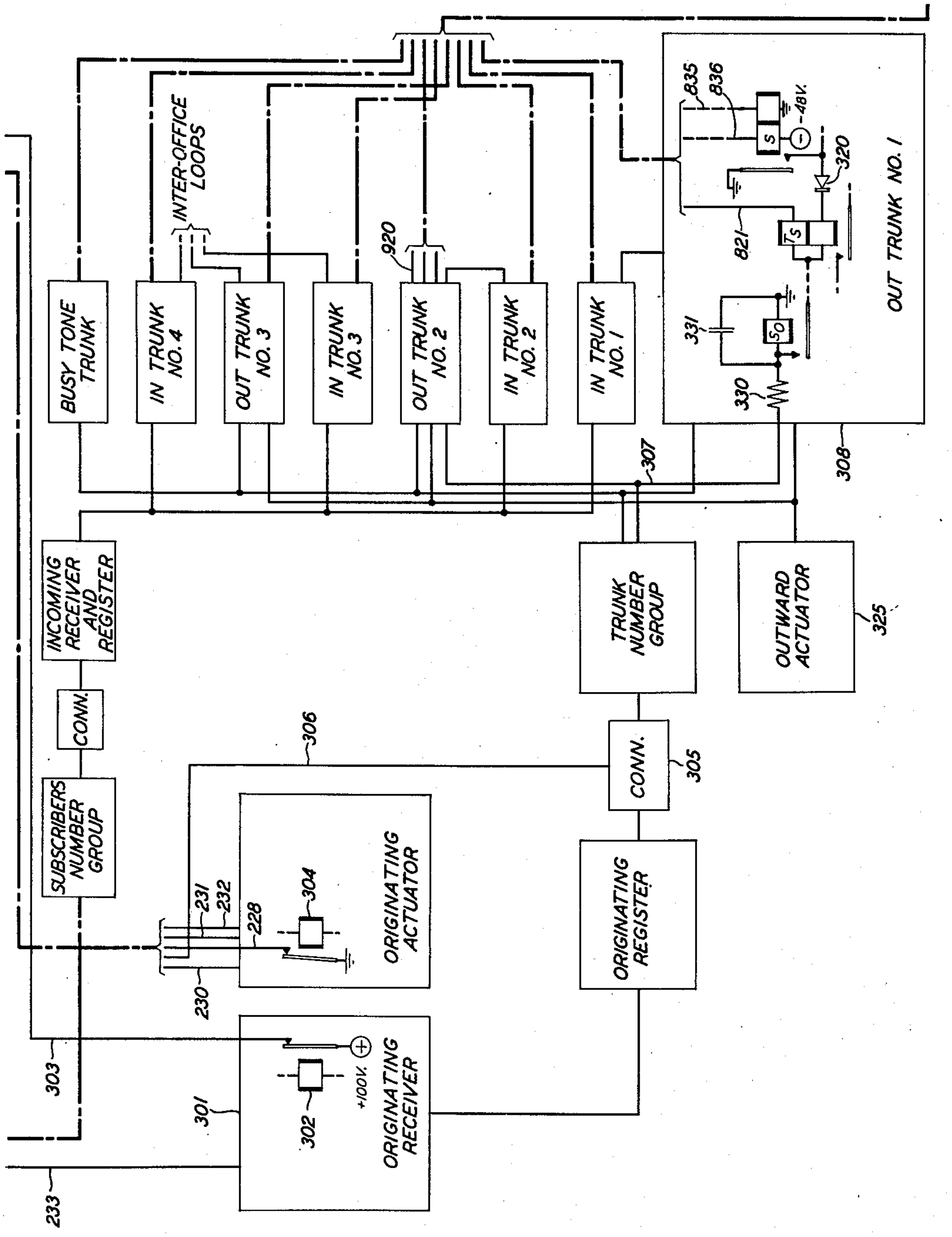

The control equipment represented in Fig. 3 of the drawings is disclosed in detail in the above-cited application of Brewer-Bruce and in the above-cited patent granted to Malthaner-Vaughan, and in applications and patents therein cited. Certain minor modifications of the trunk circuits thereof are herein disclosed.

In the specification, certain of the elements may be identified by a designation representing the function performed by the apparatus followed by a number in parenthesis representing the figure of the drawing on which the element appears. Thus, the line relay in line circuit 200 (Fig. 2) will hereinafter be referred to as "relay L(2)."

Figure 1:
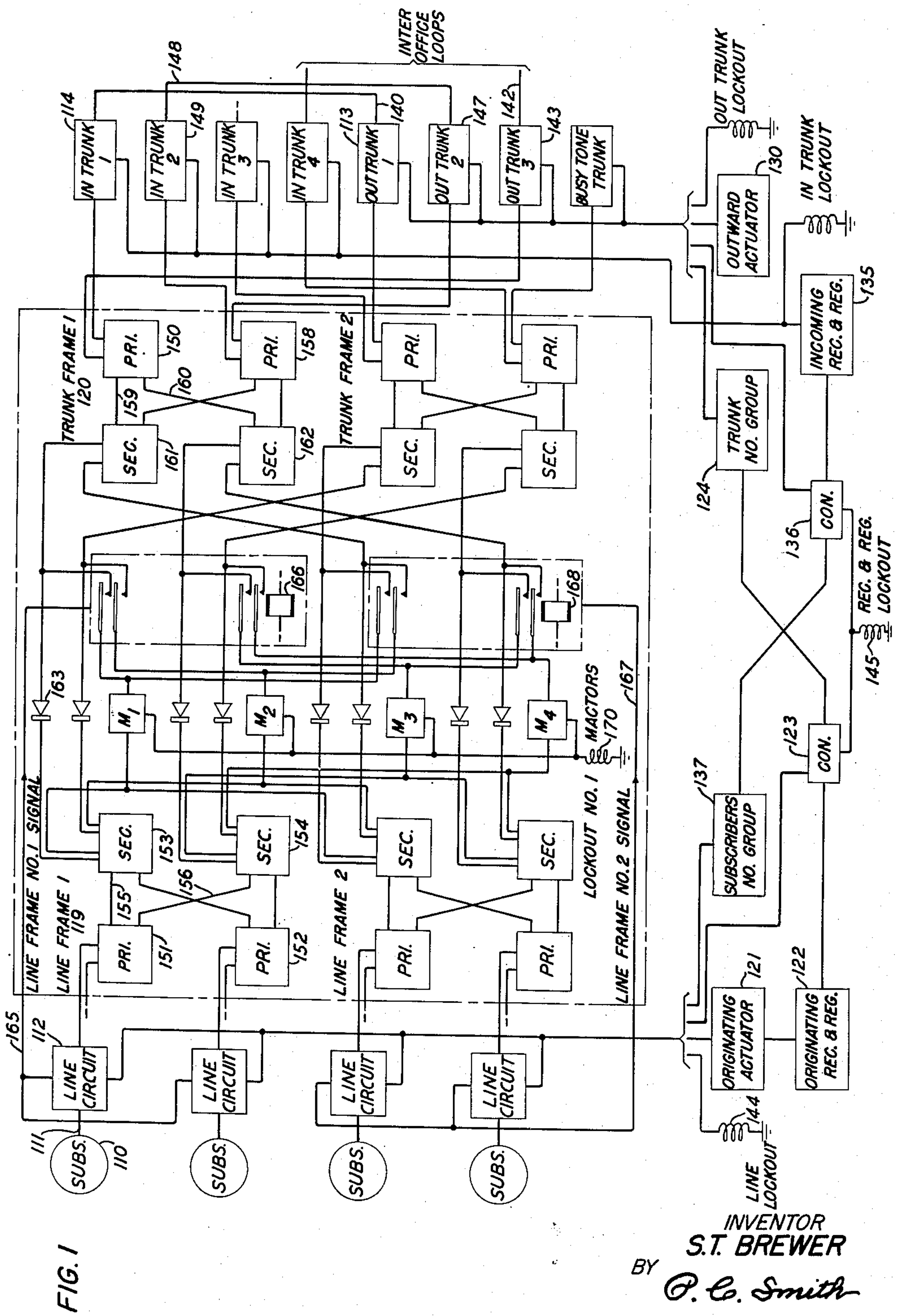
Figure 2:
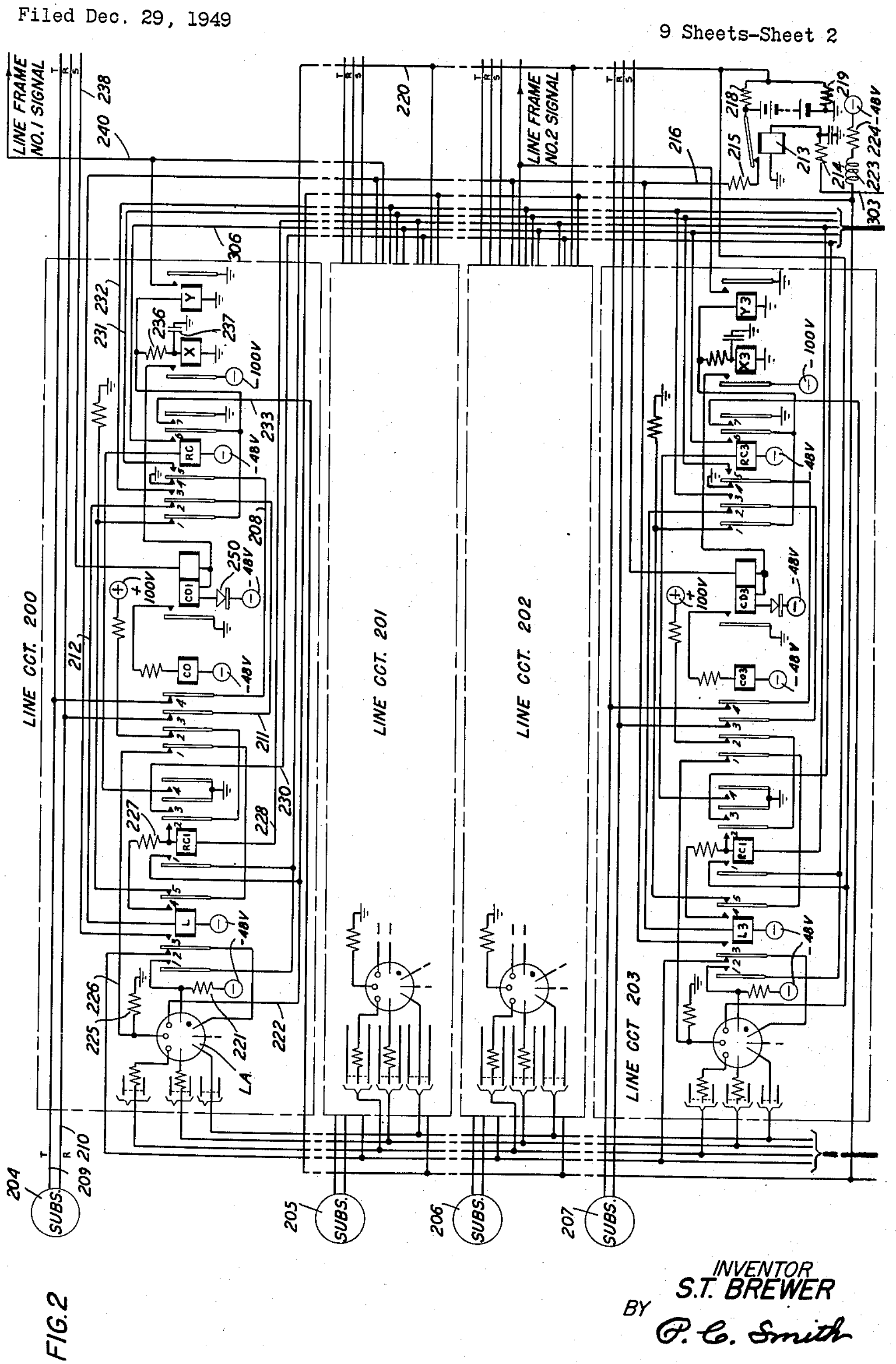

Referring first to Fig. 2, a plurality of subscribers' stations, such as stations 204—207 are provided with individual line circuits such as line circuits 200—203, respectively. The calling subscriber, assumed to be the subscriber at station 204, presets the designation of the desired called party and lifts his handset to close the switchhook contacts of his subset whereby a direct-current circuit is established from ground at the No. 4 contact of relay RC(2) in line circuit 200, which is individual to station 204, conductor 208, No. 4 contact of relay CO(2) to the tip conductor 209, through the closed switchhook contacts, ring conductor 210, No. 3 contact of relay CO(2), conductor 211, No. 2 contact of relay RC(2), conductor 212 and to battery through the winding of line relay L(2) whereby relay L(2) is operated.

Prior to these operations, relay 213 is operated over a path from positive battery at the back contact of relay 302 in originating receiver 301, conductor 303, resistor 214, winding of relay 213 and to ground. Therefore, when relay L(2) operates, positive battery, assumed to be positive 135-volt battery, is applied through the front contact of relay 213, resistor 215, conductor 216, No. 3 contacts of relay L(2) and to the right-hand main anode of multielement gaseous discharge tube LA(2). This tube may be of the type disclosed in the application of W. A. Depp, Serial No. 13,283, filed March 5, 1948. A path is also completed from a positive potential at the voltage divider comprising resistors 218 and 219, conductor 220, No. 1 contact of operated relay L(2) and to negative battery through resistor 221 whereby a positive potential is applied to the right-hand control anode of tube LA(2).

The right-hand control cathode of tube LA(2) is connected to negative battery via conductor 222 and through the lock-out impedances 223 and 224. The main cathode of tube LA(2) is connected to ground through resistor 225 and also via conductor 226, No. 1 contact of relay CO(2), No. 4 contact of relay L(2), resistor 227, winding of relay RC1(2) and to conductor 228 which is grounded through the front contact of operated relay 304 in the originating actuator shown in Fig. 3. Therefore, tube LA(2) will undergo a control gap discharge between the right-hand control anode and right-hand control cathode thereof, this discharge will first transfer so as primarily to exist between the right-hand main anode and right-hand control cathode and then a second transfer of discharge will occur whereby conduction will primarily exist between the right-hand main anode and the main cathode of tube LA(2) whereby relay RC1(2) will be operated. Lock-out between the several line tubes exists in the manner disclosed in United States Patent 2,350,888 granted to N. I. Hall on June 6, 1944.

Relay RC1(2), in operating, locks to positive battery through its No. 2 contact and the No. 2 contact of relay CO(2) and this positive voltage extinguishes tube LA(2). The line circuit lock-out is maintained, however, since the voltage drop in elements 223 and 224 is maintained by the connection of the positive potential on conductor 220 to conductor 222 upon the closure of the No. 1 contact of relay RC1(2). Relay RC1(2), in operating, also applies ground through its No. 3 contact to conductor 230 to signal the originating actuator (Fig. 3), and applies ground through its No. 4 contact to operate relay RC(2).

Relay RC(2), in operating, disconnects the tip and ring conductors 209 and 210 from ground and the winding of relay L(2), respectively, and extends these leads via conductors 231 and 232, respectively, to the originating actuator (Fig. 3). Relay L(2) thereby releases. Relay RC(2), in operating, also connects ground through its No. 7 contact to conductor 233, which is common to all line circuits, to signal the originating receiver (Fig. 3).

In a manner fully described in the above-cited application of Brewer-Bruce and the above-cited patent granted to Malthaner-Vaughan, and applications and patents therein cited, the originating actuator and originating receiver (Fig. 3) then function, the former serving to transmit 45-cycle alternating current over the tip and ring conductors on a simplex basis to subset 204. As a result, the subset generates pulse position signals in accordance with its settings and these signals are passed from the originating actuator to the originating receiver 301. The originating receiver 301 receives the called party's designation and then transfers the office code designation to the originating register (Fig. 3.)

Relay 302, in the originating receiver, is then operated. Relay 302, in operating, releases relay 213, which removes the line tube main anode battery supply to prevent any of the line tubes from seizing the originating receiver until the receiver has restored to normal. Relay 302, in operating, also operates the connector 305 to link the receiver to the trunk number group, assuming that circuit to be idle, and locks out other receivers.

Connector 305 then applies positive battery, assumed to be positive 100-volt battery, to conductor 306, No. 6 contact of operated relay RC(2) in the utilized line circuit 200, to ground through the winding of relay Y(2), and through resistor 236 to ground, in parallel, through capacitor 237 and the winding of relay X(2). Relays X(2) and Y(2) will thereby be operated, but relay X(2) is slow to operate by virtue of the shunting capacitor 237.

Relay X(2), in operating after a delay interval applies a "line mark" to the associated line frame primary switches. Thus, relay X(2), in operating, applies negative battery, assumed to be negative 100-volt battery, through its front contact, primary (right-hand) winding of marginal relay CO1(2), sleeve lead 238, and to the left-hand electrodes of gaseous diodes LP1A(4) and LP3A(4) and of other diodes (not shown) of the primary switch 412 of line frame 410 for a purpose hereinafter to be described. Since the negative battery connected to varistor 250 is of a less negative potential than the negative battery at the contact of relay X(2), no current will flow through the secondary (left-hand) winding of relay CO1(2) and therefore relay CO1(2) will not be operated at this time.

It may be noted that had line circuit 201 been employed, this line mark would have been applied to electrodes in similar diodes in sections LP5(4) and LP7(4) and other sections (not shown) of primary switch 413 of line frame 410, that had line circuit 202 been employed, this line mark would have been applied to sections LP1(5) and LP3(5) and other sections (not shown) of primary switch 512 of line frame 510, and in a similar manner all provided line circuits are associated with a series of sections of the primary switches in the several provided line frames. The purpose of this line mark will be discussed hereinafter.

Relay Y(2), in operating, transmits a "line frame signal" to identify with which frame the utilized line circuit is associated. Thus, since line circuit 200 is associated with the No. 1 line frame, relay Y(2), in operating, connects ground to conductor 240, winding of frame relay 610 and to negative battery whereby relay 610 is operated. If a line circuit associated with line frame No. 2 had been utilized, frame relay 710 would have been operated, and in a similar manner, a frame relay individual to each other utilized frame is selectively operated for a purpose hereinafter to be described.

As shown in Fig. 3, a plurality of incoming and a plurality of outgoing trunks are provided. The incoming trunks are utilized in the terminating phase of a call, the outgoing trunks are utilized on the originating phase of a call. Certain of the outgoing trunks are linked to certain of the incoming trunks to provide intraoffice loops, while others of the incoming and outgoing trunks extend to other offices to provide interoffice loops. The trunks are divided into trunk groups, all of the trunks in any one group having a common office destination, i. e., a common office code designation.

Upon the interassociation of the originating register and the trunk number group by the connector 305, the desginated trunk group is selected and tested to ascertain the busy, idle or vacant condition of that group in accordance with the disclosure of the above-cited application of Brewer-Bruce and the above-cited patent granted to Malthaner-Vaughan, and in the manner similar to that fully disclosed in the application of W. A. Cornell et al., Serial No. 114,392, filed September 7, 1949.

Assuming for purposes of clarity that the office code of the designation of the desired called party indicates that the called subscriber is associated with this same office, one of the intraoffice outgoing trunks is to be selected. After the selection of the proper trunk group and the determination, as will be assumed, that at least one of the trunks in that group is idle, the trunk number group (Fig. 3) will apply a positive voltage, assumed to be approximately positive 80 volts, via conductor 307, through all idle trunk circuits in that trunk group and those trunk circuits extend this potential to the sleeve leads of the links individual to those trunks. It is to be understood, however, that not more than one trunk in each trunk frame extends this mark. Thus, for example, the positive voltage on conductor 307 is extended through resistor 330 and to ground through capacitor 331 and the winding of slow-to-operate relay SO(3). Upon the operation of relay SO(3), the positive potential on conductor 307 is extended through certain relay contacts (not shown) and through the winding of trunk supervision relay TS(3) in the idle No. 1 outgoing trunk 308 to sleeve conductor 821 which is connected to the right-hand electrodes of gaseous diodes TP2A(8), TP4A(8) and to other diodes (not shown) in primary switch 812 of trunk frame 810. Other trunks to which the positive voltage on conductor 307 is extended simultaneously are associated with other primary switch sections. Thus the No. 2 outgoing trunk, which will herein be assumed to be in the same trunk group as the No. 1 outgoing trunk 308, is connected via sleeve conductor 920 to diodes in section TP1(9), TP3(9) and to other diodes (not shown) in the same group in primary switch 912 of trunk frame 910. These voltages are applied for a purpose to be noted immediately hereinafter.

It may be noted that had the office code of the desired called subscriber's designation been such as to indicate a call to a different office, an outgoing trunk providing access to that distant office over an interoffice loop would have been seized, such as the No. 3 outgoing trunk, and as far as the present consideration of the originating phase of the call is concerned, the functioning of the circuits is identical. These interoffice outgoing trunks are connected to an interoffice incoming trunk in the other office.

Thus, as this time, a line frame signal has been applied via conductor 240 to operate frame relay 610, a line mark has been aplied via sleeve conductor 238 to certain of the primary switches of the line frame 410, and a trunk mark has been applied to certain primary switches of the trunk frames.

As will be seen hereinafter, it is desirable that the line frame signal be transmitted first, with the line mark and trunk marks being transmitted a delay interval later. Thus, the delay networks associated with, for example, relay X(2) in the utilized line circuit and with relay SO(3) in trunk circuit 308 are arranged so that the line mark and the trunk mark are transmitted at substantially the same time.

Figure 4:
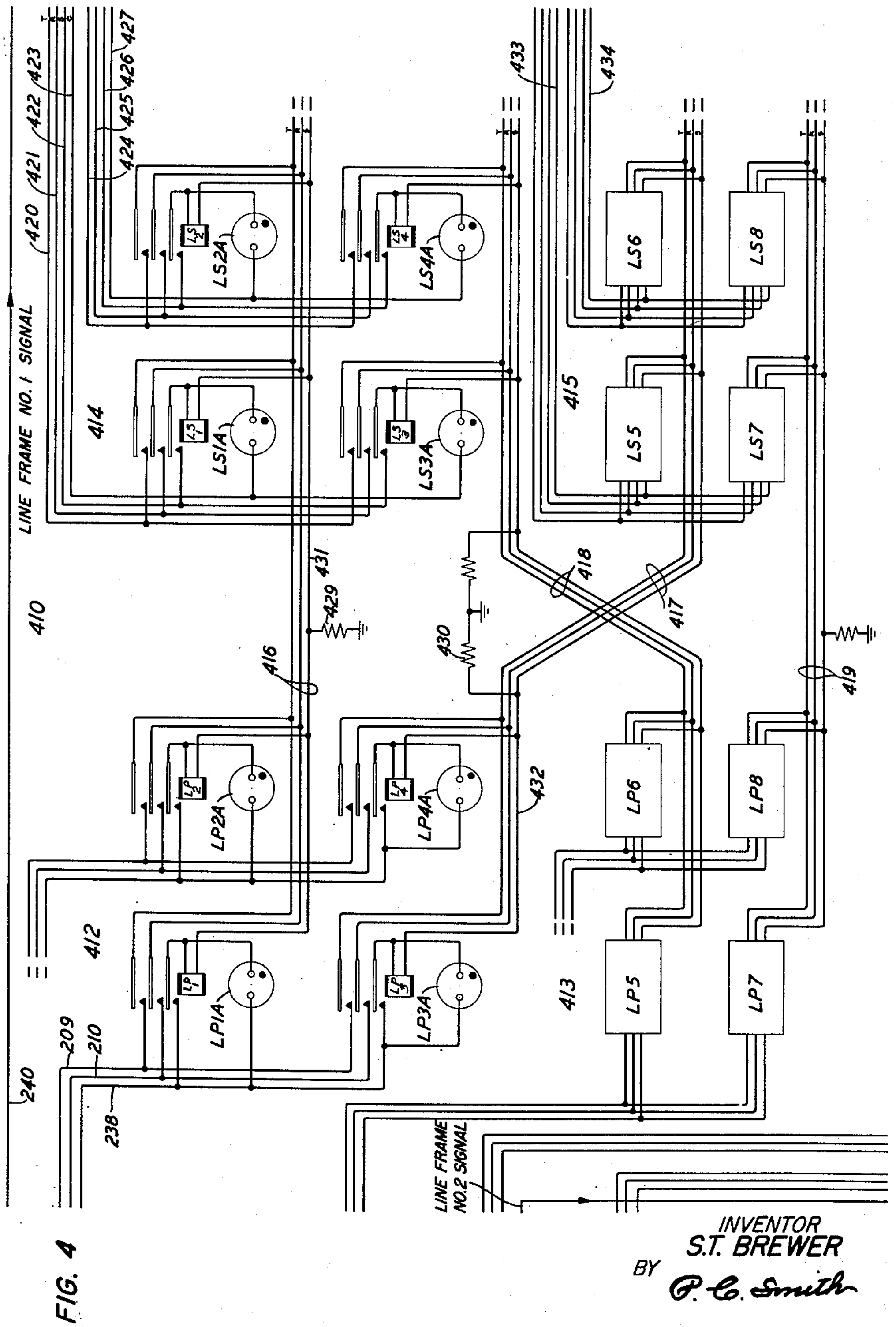
Figs. 4 and 5 show the primary and secondary switches of a first and a second line frame, respectively.
Figure 5:
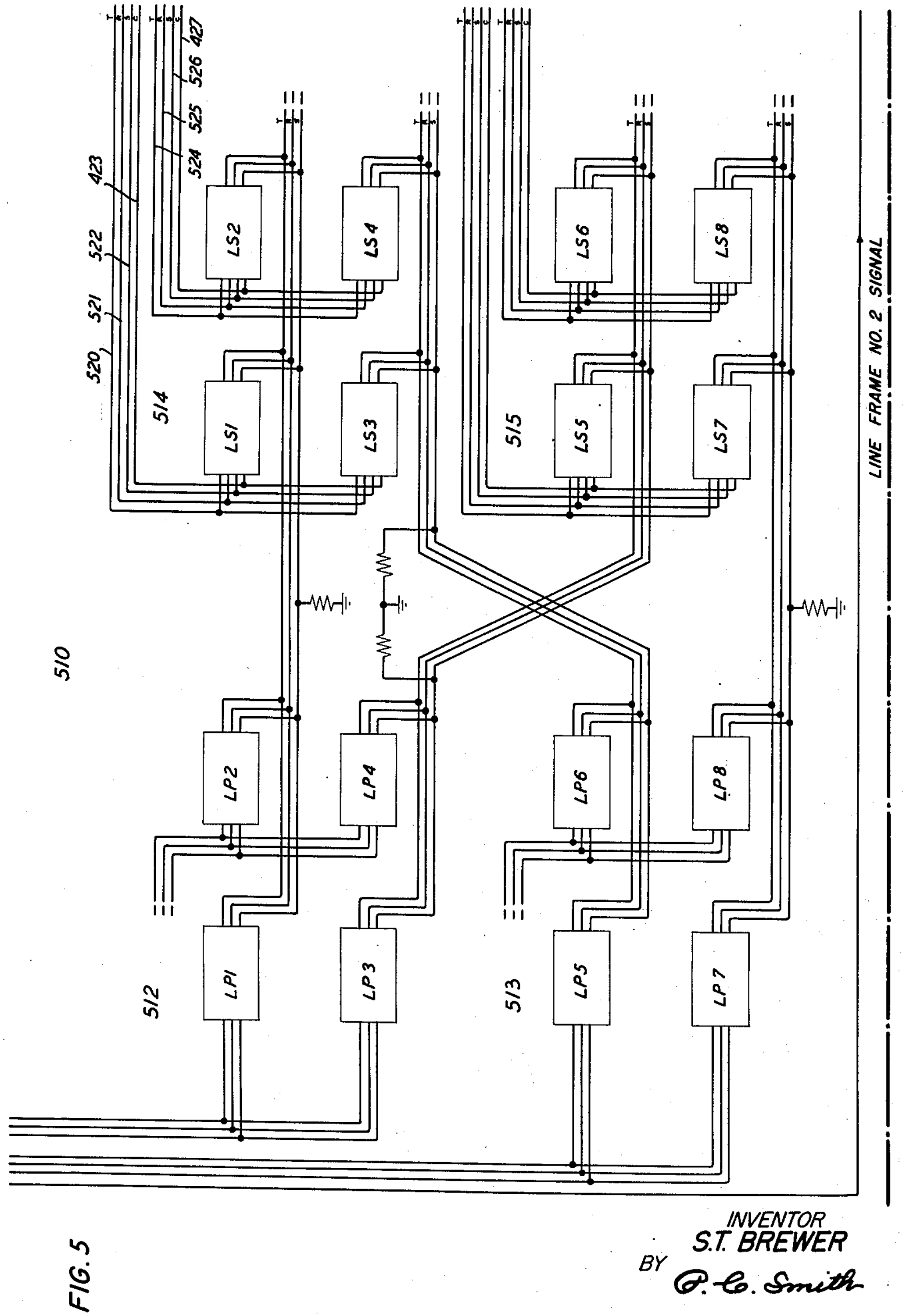

In general, the switching network comprises line frames, two of which are shown by way of example in Figs. 4 and 5, and trunk frames, two of which are shown by way of example in Figs. 8 and 9. Each line frame and each trunk frame comprises primary and secondary switches. Each primary line switch and each primary trunk switch has a plurality of vertical input columns across the switch, which are connected to line and trunk circuits respectively, and plurality of horizontal output rows across the switch. Each of these rows and columns comprises three conductors, two for the usual talking path and the third for a sleeve lead. At the intersection of each row and column, hereinafter called a cross-point, is a relay comprising an operating coil and three sets of make contacts. Two of these contact sets, when closed, connect the talking conductor of an input column to the talking conductors associated with the particular output row. A cold cathode gas diode is also associated with each cross-point relay and this diode in series with the winding of the relay is connected between the sleeve lead of the vertical input column and the sleeve lead of the horizontal output row. The third contact set of the cross-point relay, when operated, short-circuits this associated gas diode. The use of these cross-point gas diodes in the sleeve leads facilitates the identification and selection of idle paths through the switching network as described hereinafter, and the short-circuiting of said diodes at operated primary switch cross-points facilitates the holding of an established connection through the network and the maintenance of a busy indication along said path during the path selection processes of subsequent calls.

Each secondary switch is connected to form a similar rectangular array of cross-points except that the horizontal rows are used as input terminals and the vertical columns as switch outlets. Each line and trunk frame comprises a number of such primary and secondary switches arranged so as to provide one talking path from each primary switch to each secondary switch. In Fig. 4 of the exemplary system, line frame 410 shows, by way of example, two primary switches 412 and 413 which are cross-connected to two secondary switches 414 and 415. The primary switches 412 and 413 each show by way of example two input columns each of which is or may be connected to a subscriber's line circuit, such as line circuit 200, and two horizontal output rows which are connected to the horizontal inlets of secondary switches 414 and 415. Each secondary switch has two vertical outlets shown by way of example. The interconnecting conductors between primary and secondary switches, hereinafter called links, each link consisting of three conductors, are connected so that each primary switch on the frame is connected to each secondary switch on the frame. In the specific empodiment shown by way of example, the upper horizontal output of primary switch 412 is connected by link 416 to the upper horizontal inlet of secondary switch 414, and the lower horizontal outlet of primary switch 412 is connected by link 417 to the upper horizontal inlet of secondary switch 415. Similarly, the upper outlet of primary switch 413 is connected by link 418 to the lower inlet of secondary switch 414 and the lower outlet of switch 413 is connected by link 419 to the lower inlet of secondary switch 415. A second line frame is shown on Fig. 5 which can be connected to lines in the same manner as the line frame 410. Although only two primary and two secondary switches each having two inlets and two outlets are shown on each frame, is is to be understood that both the number of switches and the number of inlets and outlets per switch can be readily expanded in an obvious manner so as to provide switches and frames of any desirable size, and any desirable number of such frames may be provided having a number of input line circuits consistent with the operating times of the system and the calling habits of the subscribers and having a similarly consistent number of primary-secondary link paths and secondary outlets. For example, line frames might be provided with seventy inlets and ten outlets per primary switch and ten primary switches per line frame and with ten secondary switches per line frame, each secondary switch having ten inlets and ten outlets.

Proceeding from the trunk output side of the switching network backward through the office, a similar frame arrangement is disclosed. Fig. 8 shows by way of example trunk frame 810 comprising two primary switches 812 and 813, and two secondary switches 814 and 815. The primary and secondary switches are interconnected in the manner described above for the line frame so that primary switch 812 is connected by link 816 to secondary switch 814, and by link 817 to secondary switch 815; and primary switch 813 is connected by link 818 to secondary switch 814 and by link 819 to secondary switch 815. A similar trunk frame is shown in Fig. 9. Although only two primary and two secondary switches each having two inlets and two outlets are shown on each frame, it is to be understood that both the number of switches and the number of outlets and inlets per switch may be readily expanded in an obvious manner so as to provide switches and frames of any desirable size, and any desirable number of switching frames may be provided having a number of trunk connections consistent with the operating times of the system and the amount of traffic to be handled and having a similarly consistent number of primary-secondary link paths and secondary outlets. For example, trunk frames might be provided comprising ten primary and ten secondary switches, each primary and secondary switch having ten outlets and ten inlets.

Connections are made between the secondary line frame switches and the secondary trunk frame switches to provide talking paths between each line frame and each trunk frame. Thus the talking conductors 420 and 421 from the left-hand vertical of the secondary switch 414 of line frame 410 are connected directly to the right-hand vertical of the secondary switch 814 of trunk frame 810; the talking conductors 424 and 425 from the right-hand vertical of the secondary switch 414 are connected directly to the left-hand vertical of the secondary switch 914 of trunk frame 910; and the talking conductors extending from the other outputs of line frame secondary switch 414 and from the outputs of the other line frame secondary switches are also connected to the vertical columns of the trunk frame secondary switches. The line frame secondary switches and the trunk frame secondary switches may be interconnected in any suitable manner, an exemplary arrangement being shown. It may be noted that each line frame secondary switch has connections to a secondary switch on each shown trunk frame.

In addition, the third or "sleeve" lead of each group of conductors extending from a vertical of each of the line frame secondary switches is connected to one of the verticals of the trunk frame secondary switches in a group with its associated talking conductors to form an interframe link. Thus, for example, sleeve lead 422—822 is grouped with talking conductors 420 and 421 and the sleeve lead 426—926 is grouped with talking conductors 424 and 425. Each of the sleeve leads is provided with a unidirectional current conducting device or varistor for a purpose hereinafter to be described. Thus, for example, varistor 601 is intermediate sleeve conductors 422 and 822 and varistor 602 is intermediate sleeve conductors 426 and 926. These elements are symbolically represented so that the arrow points in the direction of low impedance to conventional current flow.

In the disclosures of the above-identified application of Brewer-Bruce and the above-cited patent granted to Malthaner-Vaughan, a "junctor" circuit was provided for each talking path. These junctors performed among other functions, the relaying of supervision from the trunk circuits. In the disclosure of the subject invention, the junction means are labeled "mactors," a term coined to connote that the apparatus performs both "matching" and "connecting" functions as will be seen hereinafter. These mactors, however, no longer perform the operation of relaying supervision, that function being relegated to other circuits, and consequently it is not required that a mactor be provided for each talking path. As will be seen in detail hereinafter, each mactor may be common to two or more talking paths. In a full scale installation, each mactor may be shared by ten talking paths, for example, whereby only one-tenth of the number of such circuits formerly employed are now required. In addition, each mactor circuit is considerably simplified to provide a junction means of greatly reduced cost.

In the disclosed embodiment of the invention, each mactor is shared by two talking paths, one extended from each depicted line frame, although it is to be understood that this is but exemplary as above noted. Mactor No. 1 (Fig. 6), shown in detail, is selectively associable either with the talking path comprising tip and ring conductors 420 and 421 which extend from the left-hand vertical of the line frame secondary switch 414 or with the talking path comprising tip and ring conductors 520 and 521 which extend from the left-hand vertical of the line frame secondary switch 514.

This selective association is accomplished by means of the aforesaid frame relays 610 and 710, and others (not shown). As before mentioned, if the subscriber's line circuit is in line frame No. 1, a signal is transmitted to operate relay 610 whereas if the employed line circuit is in line frame No. 2, a signal is transmitted to operate relay 710. If relay 610 is operated, the sleeve lead 822 is connected through the No. 1 contact of that relay to conductor 603 which extends to mactor No. 1; sleeve lead 926 is connected through the No. 2 contact of relay 610 to conductor 604 which extends to mactor No. 2; and so on, with the sleeve conductors of each interframe link extending from line frame No. 1 being connected to individual ones of the provided mactors. Similarly, if relay 710 had been operated as a result of the utilization of a line circuit in line frame No. 2, sleeve lead 922 would have been connected through the No. 1 contact of that relay and via conductor 603 to mactor No. 1, sleeve lead 826 would have been connected through the No. 2 contact of relay 710, and via conductor 604 to mactor No. 2, and so on, with the sleeve conductor of each interframe link extending from line frame No. 2 being connected to individual ones of the provided mactors. A frame relay, such as relays 610 and 710, is provided for each line frame and is operative to associate the interframe links from that frame with the provided mactors. Thus, only one set of mactors is required even though several frames be provided.

As will be seen in detail hereinafter, a fourth or control lead is extended from each of the vertical columns of the secondary switches of the line frames. The control conductors in corresponding elements of the several line frames are multipled to extend to individual mactors. Thus, control lead 423 extends from the left-hand vertical of secondary switch 414 in line frame No. 1 and from the left-hand vertical of secondary switch 514 in line frame No. 2 and is connected to mactor No. 1. Similarly, control lead 427 extends from the right-hand vertical of secondary switch 414 to mactor No. 2 and also from the right-hand vertical of secondary switch 514 to mactor No. 2. These control conductors are also common to the corresponding elements of all other provided line frame secondary switches. In a similar fashion, control conductors from other line frame secondary switch elements extend to the other provided mactors.

Figure 6:
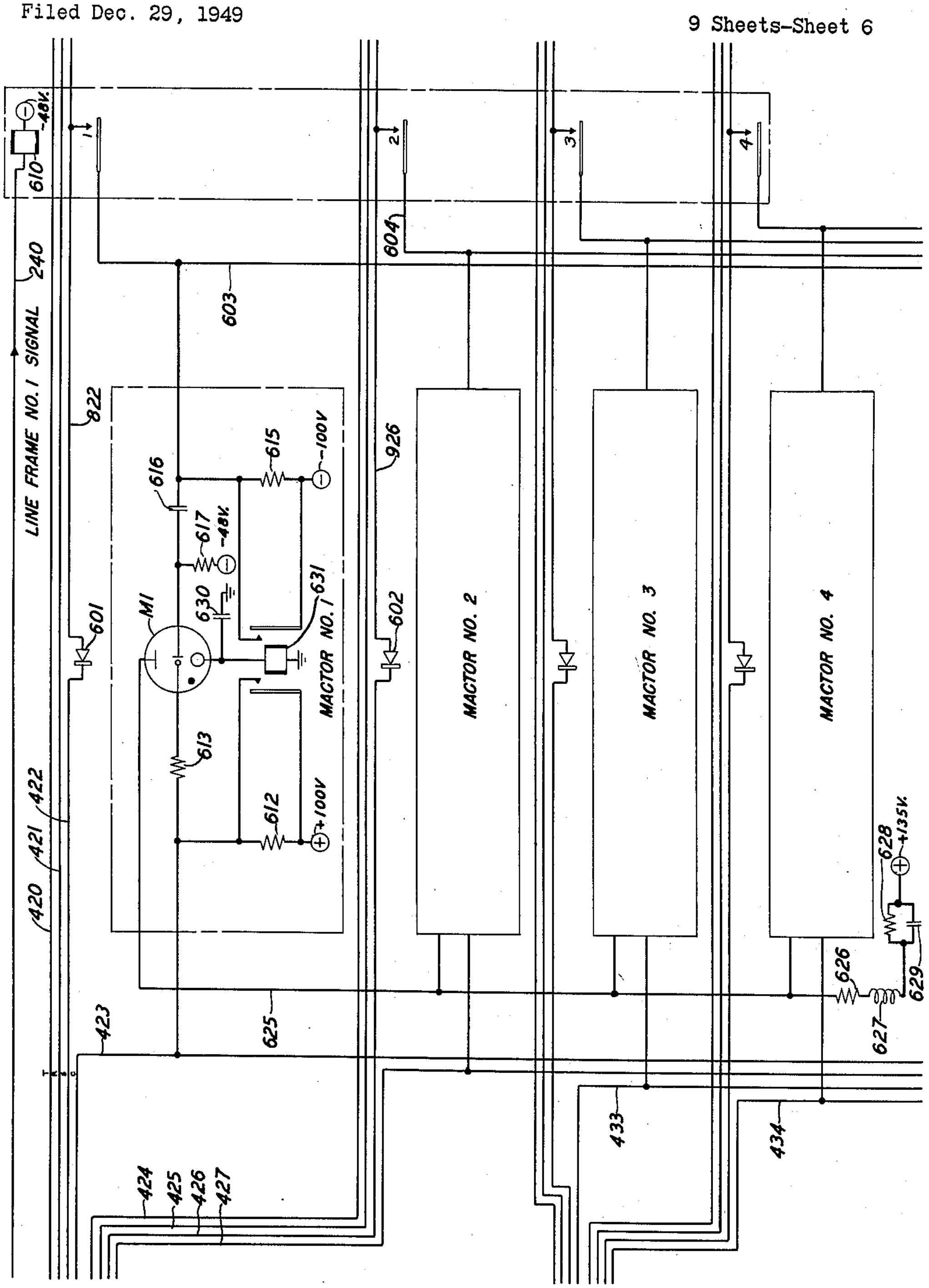
Fig. 6 shows certain interframe links, a first frame relay and the junction means or mactors.
Figure 7:
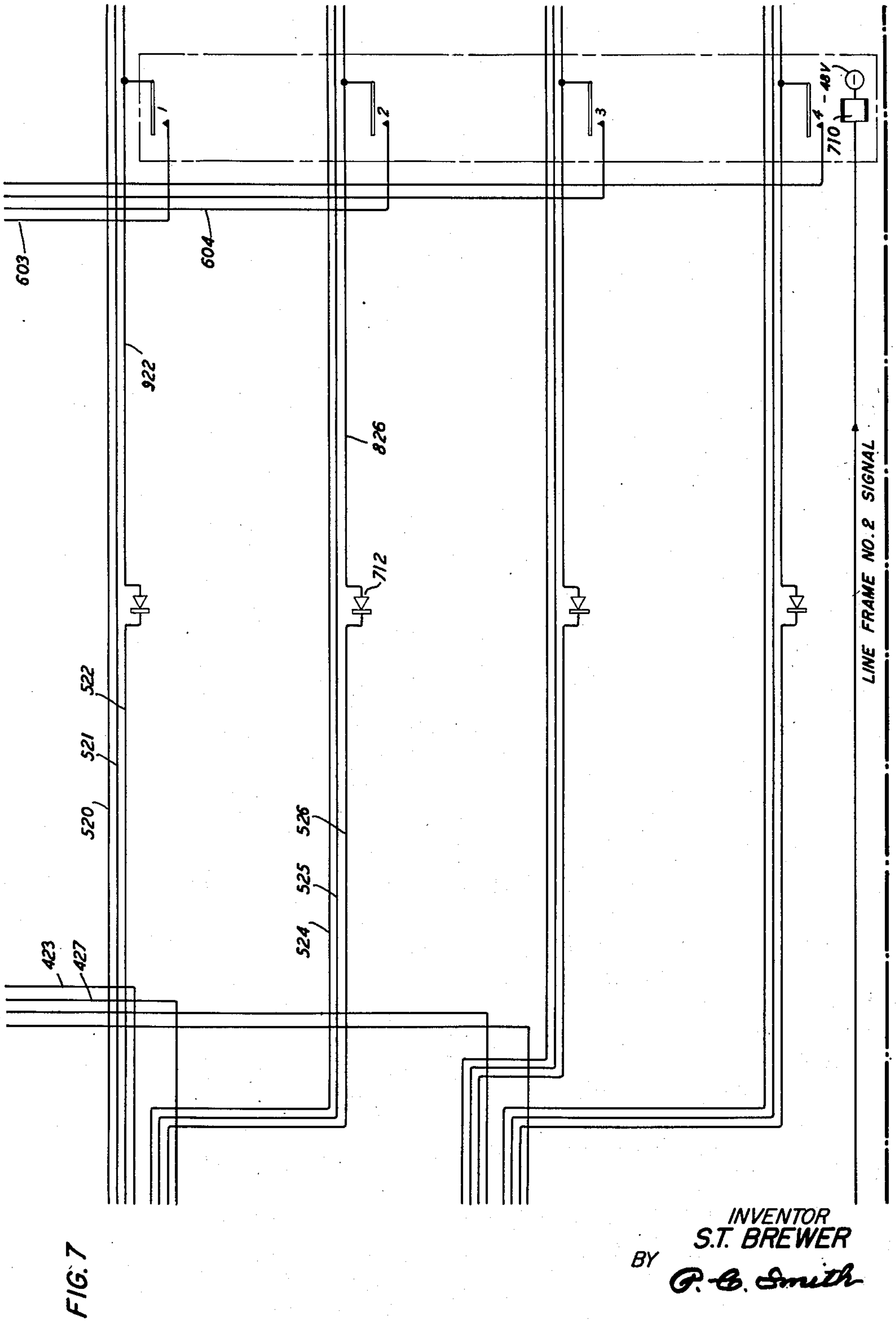
Fig. 7 shows other interframe links, and a second frame relay.

As hereinbefore described, under the assumed conditions a negative voltage line mark is applied to sleeve lead 238 which is connected to the left vertical of line switch 412 and a positive trunk mark is applied to sleeve leads 821 and 920 which are connected to the verticals of trunk primary switches 812 and 912, respectively. Assuming further that the paths through the line frame 410 and trunk frames 810 and 910 are all idle, the negative voltage on sleeve lead 238 causes gas diodes LP1A(4) and LP3A(4) (and other intermediate diodes not shown) to break down since the other sides of these diodes are connected through the windings of relays LP1(4) and LP3(4), (and other relays not shown) respectively, and through large resistors 429 and 430, respectively (with other resistors being individual to other line links not shown), to ground. These resistors are of sufficient value that the discharge in the diodes is maintained but the current through the associated series relay windings LP1(4) and LP3(4) and the winding of relay CO1(2) is considerably below that necessary to operate these relays. When tube LP1A(4) is fired, a voltage drop is produced across resistor 429 so that the potential of lead 431 changes from the original ground potential to a negative potential. This change in voltage on lead 431 causes diode LS1A(4) in secondary switch 414 to fire since the other side of diode LS1A(4) is connected by control lead 423 through a large series resistor 612 to positive battery, assumed to be positive 100-volt battery, in mactor No. 1 (Fig. 6). When diode LS1A(4) is fired the potential on control lead 423 falls from the positive battery potential to a less positive potential. In a similar manner the rise in potential on sleeve lead 431 also causes breakdown of diode LS2A(4) in secondary switch 414 since the other side of that diode is connected via control lead 427 through a high resistance to positive battery in mactor No. 2 (Fig. 6). At the same time, breakdown of tube LP3A(4) causes a drop in potential on lead 432 which causes breakdown of the diodes associated with cross-points LS5(4) and LS6(4) in secondary switch 415. The breakdown of these diodes in secondary switch 415 marks control leads 433 and 434 to mactors Nos. 3 and 4, respectively, in the manner described above. Thus, as a result of the mark placed on the switches through sleeve lead 238 from the line circuit 200 of the calling line, diodes LP1A(4), LP3A(4), LS1A(4), LS2A(4) and the diodes in sections LS5(4) and LS6(4) are fired and the potential on leads 423, 427, 433 and 434 is dropped from positive battery potential to a less positive value which, in effect, puts a voltage mark on the gas tube in each of the above-mentioned mactor circuits. Thus, the voltage mark on lead 423 is applied through resistor 613 to the control cathode of cold cathode gaseous discharge device M1(6) in mactor No. 1. Similar tubes in the remaining mactors are marked in a similar manner.

At trunk frame 810, the positive potential mark on sleeve lead 821, applied as above described, causes the breakdown of diode TP2A(8) since the other electrode of that diode is connected to negative battery through resistor 825, sleeve lead 830 and through the winding of relay TP2(8). Diode TP4A(8) is also caused to break down at the same time since its other electrode is connected to a source of negative potential through resistor 827, sleeve lead 828 and through the winding of relay TP4(8). As a result of the operation of diodes TP2A(8) and TP4A(8), the potential on sleeve leads 830 and 828, respectively, will rise, and may rise to a positive value. This less negative potential on lead 830 of link 816 is applied through the windings of relays TS1(8) and TS2(8), respectively, to one electrode of diodes TS1A(8) and TS2A(8), respectively. The other electrode of diode TS1A(8) is connected via sleeve conductor 822, through the No. 1 contact of operated frame relay 610, conductor 603, resistor 615 and to negative 100-volt battery in mactor No. 1 (Fig. 6). Therefore, with frame relay 610 operated, diode TS1A(8) will undergo a discharge.

Prior to this discharge, capacitor 616 has negative 100-volt battery applied to its right-hand electrode through resistor 615 and negative 48-volt battery applied to its left-hand electrode through resistor 617. Upon the firing of diode TS1A(8), the potential on conductor 603 will rise due to the potential drop across resistor 615 and capacitor 616 will therefore transmit a positive pulse to the control anode of tube M1(6) in mactor No. 1. It may be noted that the resistance of resistor 615 is large enough to prevent the operation of relays TS1(8), TP2(8), or relay TS(3) in the No. 1 outgoing trunk 308.

It may be noted that the other electrode of diode TS2A(8) is connected to sleeve lead 826, varistor 712, via sleeve lead 526 to secondary switch 514 in the No. 2 line frame. Had the call been originated from a line circuit associated with this frame, frame relay 710 would have been operated rather than frame relay 610 and diode TS2A(8) would have been connected through the No. 2 contact of relay 710, conductor 604, and the No. 2 mactor.

The rise in potential on sleeve lead 828 resulting from the operation of diode TP4A(8) is applied in a similar manner to diodes at cross-points TS5(8) and TS6(8) in trunk secondary switch 815. The other electrode of the diode at cross-point TS5(8) is connected through the No. 3 contact of frame relay 610 to mactor No. 3 (Fig. 6), while had frame relay 710 been operated, the diode at cross-point TS6(8) would have been connected through the No. 4 contact of relay 710 to mactor No. 4. In a similar manner other available paths (not shown) utilizing other provided mactors (not shown) are marked by this method.

It may be noted that concurrently with the above operation, paths were also being marked between the mactors and the other idle outgoing trunks in the selected trunk group. Thus, as a result of the trunk mark applied through the No. 2 outgoing trunk to sleeve conductor 920, with frame relay 610 operated, a plurality of paths will be marked from this trunk to the mactors. One such path would be marked by the discharge of diodes in cross-points TP1(9) and TS2(9) and a trunk marking potential would thereby be applied to the mactor tube in mactor No. 2 (Fig. 6). Another such path would be marked by the discharge of diodes in cross-points TP3(9) and TS6(9) and a trunk marking potential would thereby be applied to the mactor tube in mactor No. 4 (Fig. 6). Had other line frames been used, other paths would have been marked. Thus, had line frame No. 2 been employed, frame relay 710 would have been operated and, among others, paths would have been marked through cross-points TP1(9) and TS1(9) to mactor No. 1 and through cross-points TP3(9) and TS5(9) to mactor No. 3 (Fig. 6).

In all cases, the current flowing through the marked paths at this time is insufficient to operate the relays in series with those paths.

The mactor circuits are arranged to operate when a mark is present on both the control lead from the line frame and the sleeve lead from the trunk frame. As described above for the exemplary system, all of the mactors are marked from the line frame side by a marking potential extended from the utilized line circuit, mactors No. 1 and No. 3 (and others not shown) are marked from the trunk frame side by a marking potential extended through the No. 1 outgoing trunk 308 and mactors No. 2 and No. 4 (and others not shown) are marked from the trunk frame side by a marking potential extended through the No. 2 outgoing trunk 309.

The mactor circuits are identical and only that of mactor No. 1 (Fig. 6) has been shown in detail. The mactor tubes may be of any suitable type and are herein shown to be cold cathode gaseous discharge tetrodes. The main anodes of these tubes are connected in common via conductor 625 to positive 135-volt battery over a circuit including resistor 626, inductor 627, and through the parallel network comprising resistor 628 and capacitor 629. Each mactor tube is provided with an individual main cathode circuit such as, for tube M1(6), a connection to ground through capacitor 630 and the winding of relay 631, in parallel.

With a negative marking potential applied to the control cathodes of all of the mactor tubes in mactors associated with idle paths through the line frame, and with the frame relay having previously been operated, here assumed to be frame relay 610, a positive marking pulse is applied to the control anode of each of the mactor tubes in mactors associated with idle paths through the trunk frames to the idle trunks in the selected trunk group. Therefore, each of these mactor tubes will undergo a discharge between the control anode and the control cathode thereof. Since the main anodes of these tubes are connected to positive battery as above described, each of these tubes may undergo a first transfer of discharge whereby conduction may exist between the main anode and the control cathode of each of these tubes. Due to the potential drop across resistor 613, the potential at the control cathode of each utilized mactor tube will rise to a voltage positive relative to ground. Therefore, each utilized mactor tube will tend to undergo a second transfer of discharge wherein conduction will exist primarily between the main anode and the main cathode thereof. Due to differences in the tubes, one of the tubes, assumed to be tube M1(6) will first undergo this second transfer of discharge.

The purpose of delaying the application of the line mark and the trunk mark will be apparent at this time. If the path be busy, the sleeve lead of that path, such as sleeve lead 822, will be at a potential of approximately negative 24 volts. Therefore, if the line mark were applied prior to the time the frame relay were operated, a positive pulse of sufficient magnitude to fire the mactor tube might be applied to the control anode of that tube upon the operation of the frame relay. Therefore, the frame relay is operated first whereby any false pulse applied to the control anode of the mactor tube is ineffective since a suitable potential is not yet applied to the control cathode. After an interval sufficient for this false pulse to attenuate, the line mark is transmitted whereby a negative potential is applied to the control cathode of the mactor tube and the trunk mark is transmitted whereby a positive pulse is applied to the control anode of the mactor tube, assuming the mactor and associated path to be idle.

The capacitors in the main cathode circuits of the several tubes, such as capacitor 630, are of such size that they maintain these cathodes at substantially the same potential during the lock-out interval. As a result, there is substantially no impedance individual to the main anodes or to the main cathodes of these tubes. The only effective impedance in the circuit during the lock-out interval, which takes place before the main cathode capacitors receive an appreciable charge, is the common lock-out impedance comprising resistor 626 and inductor 627. As a result, in a manner fully described in the above-cited patent to N. I. Hall, a second transfer of discharge can occur in only one of the utilized mactor tubes. Thus, by this lock-out action only one mactor will be operated so that only one path will be selected through the switch network for the connection of the subscriber to a trunk circuit.

After capacitor 630 is charged, relay 631, in the main cathode circuit of tube M1(6), will be operated.

Relay 631, in operating, completes a shunt around current-limiting resistor 612, and the increased conduction over the previously traced path including control conductor 423 and the relays and diodes in the marked path, i. e., relays LS1(4) and LP1(4) and diodes LS1A(4) and LP1A(4) will cause the operation of relays LS1(4) and LP1(4). The parameters of the circuit are preferably arranged, however, such that the drop in potential across the diodes at this instant is such as to prevent the operation of relay CO1(2) in the subscriber's line circuit 200. Relay LP1(4), in operating, completes, at its inner contact, a shunting path for diode LP1A(4) whereby that diode is extinguished.

Relay 631, in operating, also completes a shunt around current-limiting resistor 615, and the increased conduction over the path including diodes TS1A(8) and TP2A(8) and relays TS1(8) and TP2(8) will cause the operation of relays TS1(8) and TP2(8). Relays TS1(8) and TP2(8) shunt out diodes TS1A(8) and TS2A(8), respectively.

Therefore, at this time, the talking conductors 209 and 210 from the calling subscriber's line circuit 200 are extended through contacts of cross-point relay LP1(4) in primary switch 412 of line frame 410, via link 416, through contacts of cross-point relay LS1(4) in secondary switch 414 of line frame 410, to conductors 420 and 421, through contacts of cross-point relay TS1(8) in secondary switch 814 of trunk frame 810, link 816, through contacts of cross-point relay TP2(8) in secondary switch 812 of trunk frame 810, and via conductors 835 and 836 to the No. 1 outgoing trunk circuit 308, through back contacts of certain relays (not shown) and to ground and negative battery, respectively through the windings of relay S(3) whereby that relay is operated.

At this instant, with relay 631 in mactor No. 1 operated, positive 100-volt battery is connected via control lead 423, through conducting diode LS1A(4), through the inner contact of operated relay LS1(4) to sleeve conductor 422. Sleeve conductor 422 is also extended through the closed contact and winding of relay LS1(4) to ground through resistor 429 and via link 416, winding and closed contact of relay LP1(4), conductor 238, primary winding of relay CO1(2), and to negative 100-volt battery at the contact of operated relay X(2) in line circuit 200 whereby relay CO1(2) is operated. The parameters of the circuit are selected such that the potential on sleeve conductor 422 will be at ground potential or slightly positive relative to ground. At the same instant, with relay 631 in mactor No. 1 operated, negative 100-volt battery is applied via conductor 603, through the No. 1 contact of operated frame relay 610 to sleeve conductor 822. Therefore, at this instant, varistor 601 will not conduct.

As previously noted, the main anode circuit of the mactor tubes includes a network comprising resistor 628 and capacitor 629. This serves as an extinguishing network. After a suitable interval of time, capacitor 629 will charge to a sufficient value so that the impedance of the main anode circuit of the mactor tubes will rise to a point where those tubes will be extinguished. This interval should be selected to be the minimum over the time required for the pulse through capacitor 615 to attenuate and for the relays in the selected path to operate. After that interval, all mactor tubes which have undergone a control gap discharge and a first transfer of discharge will be extinguished and the selected mactor tube, tube M1(6), which has undergone both a first and a second transfer of discharge will also be extinguished whereby relay 631 will be released.

It may be noted that the extinguishing circuit should be positioned in a manner similar to that shown so that it is common to all mactor tubes so as not to interfere with the lock-out feature.

Upon the release of relay 631 in mactor No. 1, resistors 612 and 615 are again placed in the circuits. As a result, the potential on sleeve lead 822 to the right of varistor 601 rises in potential, and the potential on sleeve lead 422 to the left of varistor 601 falls to a negative value whereby varistor 601 conducts and diode LS1A(4) is extinguished. Therefore, a positive potential is transmitted through the selected trunk circuit via the sleeve lead, through the trunk frame operated cross-points, varistor 601, through the line frame operated cross-points, conductor 238, and through the winding of relay CO1(2) to negative battery.

Relay CO1(2), in operating, operates relay CO(2). Relay CO(2), in operating, opens the connection from the tip and ring conductors 209 and 210 to the contacts of relay RC(2), opens, at its No. 1 contact, the main cathode lead 226 of line tube LA(2) to make this line test busy, and releases relay RC1(2). Relay RC1(2), in releasing, removes the ground from conductor 230 and releases relay RC(2). Relay RC(2), in releasing, removes the ground from conductor 233 and releases relays X(2) and Y(2). Relay Y(2), in releasing, removes the line frame signal thereby releasing frame relay 610. Relay X(2), in releasing, removes negative 100-volt battery from the common point of the windings of relay CO1(2), but that relay remains operated from positive battery over the previously traced path, thru both windings of relay CO1(2), varistor 250 and to negative battery.

The removal of ground from conductors 230 and 233 precipitates the release and restoral to normal of the common control equipment of Fig. 3 utilized in the originating phase of the call. Relay 302 in the originating receiver is released to reoperate relay 213 which recloses main anode battery to the line circuit so that an originating call may be started by another subscriber.

The trunk number group is then operative to remove the marking voltage from conductor 307 which connects to the common point of the windings of relay TS(3) in the No. 1 outgoing trunk circuit 308. Therefore, both the line mark and the trunk mark are removed, but supervision is maintained over a path from ground at the front contact of operated relay S(3), varistor 320, windings of relay TS(3) in the utilized trunk circuit, sleeve conductor 821, trunk frame cross-points TP2(8) and TS1(8), sleeve conductor 822, varistor 601, sleeve conductor 422, line frame cross-points LS1(4) and LP1(4), sleeve conductor 238, windings of relay CO1(2) in line circuit 200, varistor 250, and to negative battery. Thus, there is now connection between the calling subscriber's line and the trunk 308 through the switches, which is held under control of relay S(3) which is operated by the direct-current flowing through the subset 204. If the subscriber should hang up and interrupt the direct-current circuit by opening the switch-hook contacts, relay S(3) would release and in turn cause all the associated circuits to return to normal.

When the voltage marks are removed from leads 238 and 307, all switch gas diodes which had broken down to indicate idle paths but which did not take part in the final connection, are extinguished and the switches and mactors are ready for use on another connection. The paths through the switching network which were used are marked busy by having the potentials on the control leads altered so that they will not be indicated as available when paths are tested in the process of setting up a subsequent call. The extinguishing of all diodes results in removal of voltage marks from all mactors.

The trunk circuit is then operative to seize the outward actuator 325 which precipitates the terminating phase of the call. The functioning of the control circuits is fully disclosed in the above-cited patent granted to Malthaner-Vaughan and the above-cited application of Brewer-Bruce. The operation of the novel features of this circuit are identical on both the originating and terminating phases of a call.

It is to be understood that the above-described arrangements are but illustrative of the application of the principles of the invention. Numerous other arrangements may be devised by those skilled in the art without departing from the spirit and scope of the invention.

What is claimed is:

1. In a telephone switching system, a first plurality of groups of switching apparatus, a second plurality of groups of switching apparatus, a plurality of junction means electrically intermediate said first and said second pluralities of groups and common to all groups in both of said pluralities of groups of switching apparatus, and means individual to each of the groups in said first plurality of groups and operative each time any one of said first plurality of groups is employed for operatively connecting all of said junction means with said one of said groups only.

2. In a telephone switching system, a plurality of telephone lines, a plurality of trunk circuits, a first plurality of groups of switching apparatus connected to said lines, a second plurality of groups of switching apparatus connected to said trunk circuits, a plurality of junction means electrically intermediate said first and said second pluralities of groups and common to all of both of said pluralities of groups for selecting a path between any of said lines and any of said trunks through said switching apparatus, and means selectively operable each time any one of said first plurality of groups of switching apparatus is employed for operatively connecting all of said junction means with the employed one of said first plurality of groups of switching apparatus.

3. In combination in a telephone switching system, a first plurality of frames each having a plurality of primary and secondary switches, links interconnecting said primary and secondary switches, a second plurality of frames each having a plurality of primary and secondary switches, links interconnecting said latter primary and secondary switches, input circuits terminating in the primary switches of said first frames, output circuits terminating in the primary switches of said second frames, intermediate control circuits interposed said first and said second frames and shared in common by secondary switches of said first frames, a two-element gas conduction tube associated with each of said links, means for marking through the tubes associated with the links of a first frame all idle paths from an input circuit to said control circuits, other means for marking through the tubes associated with the links of said second frames all idle paths from an output circuit to said control circuits, a lock-out circuit associated with said control circuits for selecting one of the idle paths between an input circuit and an output circuit, and means for establishing a connection over the selected path.

4. In a telephone switching system, a plurality of lines, a plurality of trunk circuits, first switching apparatus connected to said lines, second switching apparatus connected to said trunk circuits, a plurality of groups of conductors extending between and interconnecting said first and said second switching apparatus, a unidirectional current conducting device serially included in one conductor in each of said groups of conductors, and control means for establishing a path including one of said groups of conductors from any one of said lines to any one of said trunk circuits through said switching apparatus and operative during the establishment of said connections to apply potentials to prevent conduction through the device in said one of said groups of conductors, and operative after said connection is established to permit conduction through said device.

5. In a telephone switching system, a plurality of lines, a plurality of trunk circuits, first switching apparatus connected to said lines, second switching apparatus connected to said trunk circuits, a plurality of groups of conductors extending between and interconnecting said first and said second switching apparatus, each of said groups comprising two talking conductors and a control conductor, a unidirectional current conducting device serially included in said control conductor in each of said groups of conductors, and control means for establishing a path including one of said groups of conductors from any one of said lines to any one of said trunk circuits through said switching apparatus and operative during the establishment of said connection to apply potentials to prevent conduction through the device in the control conductor in said one of said groups of conductors and operative after said connection is established to permit conduction over said control conductor and through said device.

6. In a telephone switching system, a plurality of line circuits, a supervisory relay in each of said line circuits, a plurality of trunk circuits, a supervisory relay in each of said trunk circuits, first switching apparatus connected to said line circuits, second switching apparatus connected to said trunk circuits, a plurality of groups of conductors extending between and interconnecting said first and said second switching apparatus, each of said groups comprising two talking conductors and a control conductor, a unidirectional current conducting device serially included in said control conductor in each of said groups of conductors, control means for establishing a path including one of said groups of conductors from any one of said line circuits to any one of said trunk circuits through said switching apparatus including the extension of said control conductor from the winding of the relay in said any one of said line circuits to the relay in said any one of said trunk circuits, said control means being operative during the establishment of said connection to apply potentials to prevent conduction through the device in said one of said groups of conductors, and operative after said connection is established to permit conduction through said device.

7. In a telephone switching system, a plurality of lines, a plurality of trunks, a first plurality of groups of switching apparatus connected to said lines, a second plurality of groups of switching apparatus connected to said trunks, a plurality of groups of conductors interconnecting said first and said second plurality of groups of switching apparatus, and means including a plurality of junction means electrically intermediate said first and said second pluralities of groups of switching apparatus and common to all of said first and of said second pluralities of groups of switching apparatus for selecting a path between any of said lines and any of said trunks through said switching apparatus and through one of said groups of conductors.

8. In a telephone switching system, a plurality of lines, a plurality of trunks, a first plurality of groups of switching apparatus connected to said lines, a second plurality of groups of switching apparatus connected to said trunks, a plurality of groups of conductors interconnecting said first and said second plurality of groups of switching apparatus, means including a plurality of junction means electrically intermediate said first and said second pluralities of groups of switching apparatus and common to all of said first plurality of groups of switching apparatus for selecting a path between any of said lines and any of said trunks through said switching apparatus and through one of said groups of conductors, and means selectively operable each time any one of said first plurality of groups of switching apparatus is employed for connecting all of said junction means to those ones of said groups of conductors which are connected to said one of said plurality of groups of switching apparatus.

9. In combination in a telephone switching system, a first plurality of frames each having a plurality of primary and secondary switches, links interconnecting said primary and secondary switches, a second plurality of frames each having a plurality of primary and secondary switches, links interconnecting said latter primary and secondary switches, input circuits terminating in the primary switches of said first frames, output circuits terminating in the primary switches of said second frames, a plurality of groups of conductors interconnecting said secondary switches of said first and said second plurality of frames, a plurality of control means electrically intermediate said first and said second frames and shared in common by the secondary switches of said first frames, a two-element gas conduction tube associated with each of said links, means for marking through the tubes associated with the links of one of said first plurality of frames all idle paths from an input circuit to said control means, other means for marking through the tubes associated with the links of said second plurality of frames all idle paths from an output circuit to said control means, a lock-out circuit associated with said control means for selecting one of the idle paths between an input circuit and an output circuit, and means for establishing a connection over the selected path.

10. In combination in a telephone switching system, a first plurality of frames each having a plurality of primary and secondary switches, links interconnecting said primary and secondary switches, a second plurality of frames each having a plurality of primary and secondary switches, links interconnecting said latter primary and secondary switches, input circuits terminating in the primary switches of said first frames, output circuits terminating in the primary switches of said second frames, a plurality of groups of conductors interconnecting said secondary switches of said first and said second plurality of frames, a plurality of control means electrically intermediate said first and said second frames and shared in common by secondary switches of said first frames, a two-element gas conduction tube associated with each of said links, means for marking through the tubes associated with the links of one of said first plurality of frames all idle paths from an input circuit to said control means, other means for marking through the tubes associated with the links of said second plurality of frames all idle paths from an output circuit to said control means, a lock-out circuit associated with said control means for selecting one of the idle paths between an input circuit and an output circuit, means for establishing a connection over the selected path, and means selectively operable in response to which one of said first plurality of frames is employed for connecting all of said control means to the ones of said groups of conductors which are connected to said one of said first plurality of frames.

11. In a telephone switching system, a plurality of lines, a plurality of trunk circuits, first switching apparatus connected to said lines, second switching apparatus connected to said trunk circuits, a plurality of groups of conductors extending between and interconnecting said first and said second switching apparatus, a unidirectional current conducting device serially included in one conductor in each of said groups of conductors, and means for controlling the effective impedance of said devices.

SHERMAN T. BREWER.

References Cited in the file of this patent

UNITED STATES PATENTS

| Number | Name | Date |
|---|---|---|
| 2,299,898 | Holden | Oct. 27, 1942 |
| 2,326,478 | Meacham | Aug. 10, 1943 |
| 2,348,626 | Holden | May 9, 1944 |
| 2,350,888 | Hall | June 6, 1944 |
| 2,392,089 | Hersey | Jan. 1, 1946 |
| 2,413,708 | Hersey | Jan. 7, 1947 |
| 2,442,872 | Giansante | June 8, 1948 |
| 2,517,599 | Reeves | Aug. 8, 1950 |
| 2,582,959 | Bruce et al. | Jan. 22, 1952 |